US012609504B2

(12) United States Patent
Kim et al.

(10) Patent No.: US 12,609,504 B2
(45) Date of Patent: Apr. 21, 2026

(54) DUAL SPECTRAL VARIABLE-BASED OPTICAL FREQUENCY SCANNING LASER LIGHT SOURCE AND MEASUREMENT DEVICE USING THE SAME AND OBJECT ANGLE-DEPENDENT DISTANCE MEASUREMENT DEVICE USING PROPAGATION ANGLE SWITCHING FOR EACH OPTICAL FREQUENCY

(71) Applicant: PUSAN NATIONAL UNIVERSITY INDUSTRY-UNIVERSITY COOPERATION FOUNDATION, Busan (KR)

(72) Inventors: Changseok Kim, Busan (KR); Hansol Jang, Busan (KR); Jeongwon Kim, Busan (KR); Dawoon Jeong, Busan (KR)

(73) Assignee: PUSAN NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 947 days.

(21) Appl. No.: 17/772,015

(22) PCT Filed: Oct. 29, 2020

(86) PCT No.: PCT/KR2020/014864
§ 371 (c)(1),
(2) Date: Apr. 26, 2022

(87) PCT Pub. No.: WO2021/086031
PCT Pub. Date: May 6, 2021

(65) Prior Publication Data
US 2022/0368098 A1 Nov. 17, 2022

(30) Foreign Application Priority Data

Oct. 31, 2019 (KR) ........................ 10-2019-0137600
Aug. 31, 2020 (KR) ........................ 10-2020-0110322

(51) Int. Cl.
H01S 3/067 (2006.01)
H01S 3/08 (2023.01)
H01S 3/10 (2006.01)

(52) U.S. Cl.
CPC ...... *H01S 3/06708* (2013.01); *H01S 3/08077* (2013.01); *H01S 3/10* (2013.01)

(58) Field of Classification Search
CPC .................................. H01S 3/10; G01S 17/34
See application file for complete search history.

(56) References Cited

U.S. PATENT DOCUMENTS 5,009,658 A * 4/1991 Damgaard-Iversen ......................
H01S 3/109
606/2.5
2008/0174762 A1* 7/2008 Liu ........................ G01S 7/4817
356/17
2017/0328988 A1 11/2017 Magee et al.

FOREIGN PATENT DOCUMENTS

JP 2006-322917 A 11/2006
KR 10-0269040 B1 10/2000
(Continued)

OTHER PUBLICATIONS

International Search Report for PCT/KR2020/014864 mailed Feb. 10, 2021 from Korean Intellectual Property Office.

*Primary Examiner* — Robert W Hodge
*Assistant Examiner* — Clara G Chilton
(74) *Attorney, Agent, or Firm* — Paratus Law Group, PLLC

(57) ABSTRACT
A measurement device includes: an optical gain unit for generating and amplifying light; a transmission optical band
(Continued)

variation unit for selecting a specific optical frequency band from the light generated by the optical gain unit, and varying the selected specific optical frequency band to transmit light; a resonant optical frequency variation unit for performing a frequency variation so that multiple resonant optical frequency orders within the specific optical frequency band vary over a variation range narrower than intervals between the respective orders; resonance induction units forming an optical resonance unit which includes the optical gain unit, the transmission optical band variation unit, and the resonant optical frequency variation unit and causes selective oscillation of light having a specific resonant optical frequency within a specific transmission optical band; and a control signal unit for varying each of the transmission optical band variation unit and the resonant optical frequency variation unit.

11 Claims, 18 Drawing Sheets

(56)                    References Cited

FOREIGN PATENT DOCUMENTS

KR      10-2010-0081036  A      7/2010
KR      10-2011-0085785  A      7/2011

* cited by examiner

<Optical gain spectrum of optical gain unit>

<Optical transmittance spectrum of transmission optical band variation unit>

<Resonant optical frequency spectrum of optical resonance unit>

FIG. 3A

<Selective oscillation of optical frequency output>

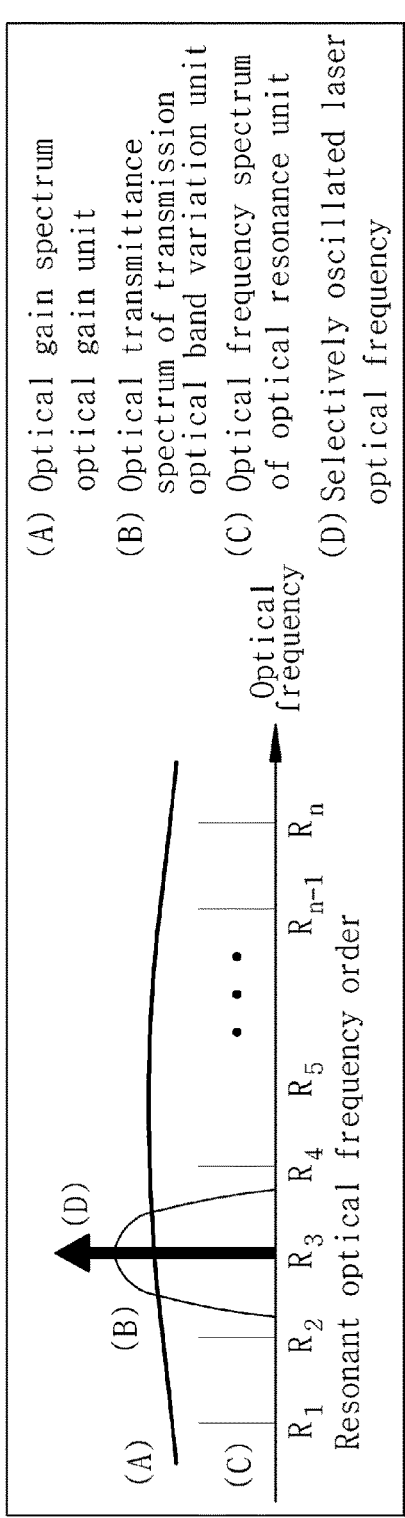

(A) Optical gain spectrum
    optical gain unit (B) Optical transmittance
    spectrum of transmission
    optical band variation unit (C) Optical frequency spectrum
    of optical resonance unit (D) Selectively oscillated laser
    optical frequency

FIG. 3B

<Variation of optical frequency band selectively oscillated by transmission optical band variation unit>

(A) Same as the existing one (B) Resonant optical frequency order
    selected through optical transmission
    band variation is changed
    (band including R3 -> band including Rn-1)

(C) Same as the existing one (D) Accordingly, selectively oscillated laser
    optical frequency is changed due to change of
    resonant optical frequency order (R3->Rn-1)

FIG. 4A

<Selective oscillation of optical frequency output>

(A) Optical gain spectrum of optical gain unit (B) Optical transmittance spectrum of transmission optical band variation unit (C) Resonant optical frequency spectrum of optical resonance unit (D) Selectively oscillated optical frequency

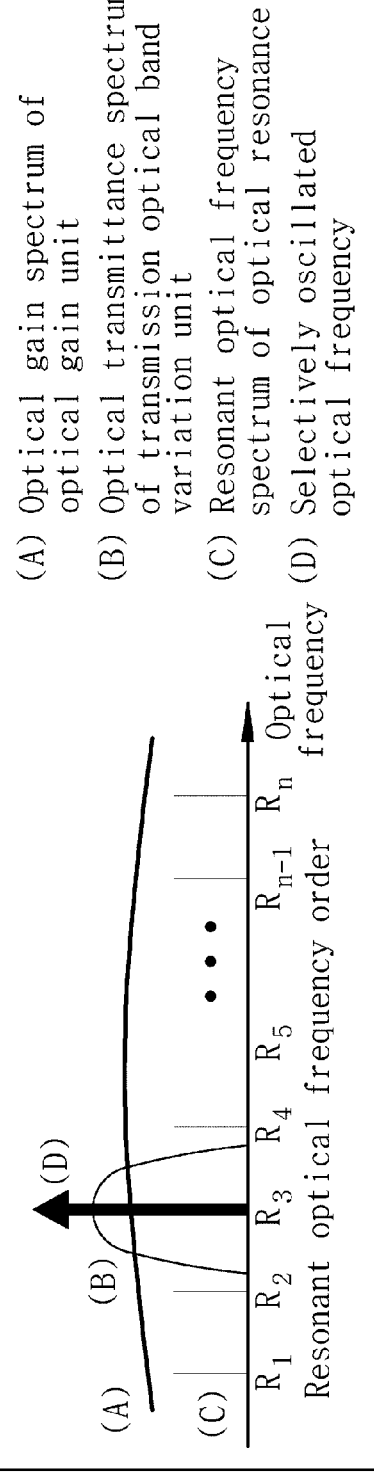

FIG. 4B

<Variation of optical frequency band selectively oscillated by resonant optical frequency variation unit>

(A) Same as the existing one (B) Same as the existing one (C) The length of optical resonance unit is changed by resonant optical frequency variation unit, and, although resonant optical frequency order is not changed, the resonant optical frequency spectrum itself is changed (R3->R3')

(D) Accordingly, selectively oscillated laser optical frequency is changed due to change of resonant optical frequency spectrum (R3-> R3')

<Single operation of transmission optical band variation unit>

<Single operation of resonant optical frequency variation unit>

<Sequential operation of  transmission optical band variation unit
and resonant optical frequency variation unit>

<Single operation of transmission optical band variation unit>

<Single operation of resonant optical frequency variation unit>

<Sequential operation of transmission optical band variation unit
and resonant optical frequency variation unit>

FMCW

ToF

FIG. 23C

AMCW

1

DUAL SPECTRAL VARIABLE-BASED OPTICAL FREQUENCY SCANNING LASER LIGHT SOURCE AND MEASUREMENT DEVICE USING THE SAME AND OBJECT ANGLE-DEPENDENT DISTANCE MEASUREMENT DEVICE USING PROPAGATION ANGLE SWITCHING FOR EACH OPTICAL FREQUENCY

CROSS-REFERENCE TO PRIOR APPLICATIONS

This application is a National Stage Patent Application of PCT International Patent Application No. PCT/KR2020/014864 (filed on Oct. 29, 2020) under 35 U.S.C. § 371, which claims priority to Korean Patent Application Nos. 10-2019-0137600 (filed on Oct. 31, 2019) and 10-2020-0110322 (filed on Aug. 31, 2020), which are all hereby incorporated by reference in their entirety.

ACKNOWLEDGEMENT

This work was supported by a National Research Foundation of Korea (NRF) grant funded by the Korea government (Ministry of Science and ICT (MSIT)) (No. NRF-2021R1A5A1032937), a Commercialization Promotion Agency for R&D Outcomes (COMPA) funded by the Ministry of Science and ICT (MSIT) (1711123345), and a Korea Medical Device Development Fund grant funded by the Korea government (the Ministry of Science and ICT, the Ministry of Trade, Industry and Energy, the Ministry of Health and Welfare, and the Ministry of Food and Drug Safety) (202011C13, KMDF_PR_20200901_0055).

BACKGROUND

The present disclosure relates a laser light source and a measurement and, more particularly, to a dual-spectral variable-based oscillation optical frequency scanning laser light source which enables sequential scanning of oscillation laser outputs, throughout the entire band wider than a channel band, and a measurement device using the same and an object angle-dependent distance measurement device using propagation angle switching for each center optical frequency.

Oscillation optical frequency scanning laser light sources are light sources in which output optical frequency varies continuously or discontinuously, which, in general, have been widely used in technologies such as optical interferometers, which use optical interference, and optical frequency domain reflectometry.

Optical frequency scanning light sources, which are generally used in high optical interference-based optical measurement technologies, are based on the principle that oscillation occurs on a specific order among resonant optical frequencies which are inversely proportional to an integral multiple of the length of an optical resonator.

Accordingly, laser outputs produced by scanning resonant optical frequencies are required to use optical frequency scanning light sources within a single band which are implemented only in a fixed band which does not allow for change of the band of these optical frequencies, and this makes it difficult to obtain information on multiple channels.

In optical transmission systems, techniques have been developed to transmit or obtain information on multiple channels by matching different optical frequencies bands to different channels by using optical frequency division multiplexing, in order to transmit optical signals through multiple channels.

However, it is hard to apply optical frequency division multiplexing due to the operational characteristics of typical optical frequency scanning laser light sources in which oscillation occurs with a laser oscillation output band fixed to a specific optical frequency band.

Another method of transmitting optical signals over each channel is time division multiplexing in which information is received from different channels in different time slots, by dividing single-band optical frequency scanning into different time slots using a delay optical fiber device (that is, buffering effect). This method has been used to transmit or receive information on multiple channels in a time-division manner.

However, this method is affected primarily by the output characteristics of light sources such as the scanning rate and duty cycle of optical frequency scanning light sources, which requires precise adjustment and makes it quite difficult to actively change the output characteristics.

Given this, it is more desirable that information is actively transmitted or received over multiple channels by means of channel division at the original source rather than transmission.

Thus, there is a need to develop laser sources capable of sequential scanning of oscillation laser outputs throughout the entire band wider than a channel band.

Meanwhile, radars, ultrasonic waves, optical metrology, etc. are used in order to measure the distance to a remote object, among which the optical metrology is used in a variety of fields, especially because of its high resolution and performance.

Optical measurement techniques used to measure the distance to an object are generally referred to as LiDAR (light detection and ranging), and are roughly divided into frequency-modulated continuous wave (FMCW) systems, time-of-flight systems, and amplitude-modulated continuous wave (AMCW) systems.

In a LiDAR technology using a frequency-modulated continuous wave system, a laser source with continuously varying frequency is used, the optical path difference between an object and a reference arm brings about a time delay, and the frequency of a resulting interference signal is detected, thereby deriving the distance to the target.

The time-of-flight systems use pulsed light and the amplitude-modulated continuous wave systems use amplitude-modulated light with periodicity. The former systems are able to derive the distance to the target by measuring the time difference between pulse signals obtained from the object and the reference arm, and the latter systems are able to derive the distance to the target by measuring the phase difference between the two signals.

LiDAR technology is recently gaining attention with the spread of autonomous vehicles.

Since autonomous vehicles require real-time observation in all directions, LiDAR devices are being developed and applied which include propagation angle scanning so that a forward propagation path moves left and right and up and down, in a space where laser light for measuring distances arrives, in order to obtain three-dimensional spatial information.

For propagation angle scanning, a rotating mirror is frequently used so that the angle changes with the direction of mechanical rotation when incident light is reflected and propagated, and, depending on the purpose, mechanical scanning devices are used most of the time, including galvo scanners, Risley prisms, and polygon mirror scanners.

However, these mechanical scanning devices are intolerant to external noise, such as vibration, and have a shorter lifetime due to performance deterioration or long-time repeated operations.

To solve these problems, research into nonmechanical scanning technologies is being conducted, such as changing the propagation angle in response to an electric signal.

An electro-optic deflector or an acousto-optic deflector is one of the common nonmechanical scanning devices, which allows for changing the angle of propagated light in response to an electric signal without mechanical behavior.

However, there remain problems with these technologies, such as most of them incurring high costs, requiring electric signals of high voltage, and narrow angle limitations.

Therefore, there arises a need for the development of optical measurement technologies that provide tolerance to external noise and allow for obtaining distance information for each propagation angle of a target at various positions in a space.

SUMMARY

The present disclosure has been made in an effort to solve the problems occurring with conventional laser sources and measurement devices, and an aspect of the present disclosure is to provide a dual-spectral variable-based oscillation optical frequency scanning laser light source which enables sequential scanning of oscillation laser outputs, throughout the entire band wider than a channel band, and a measurement device using the same and an object angle-dependent distance measurement device using propagation angle switching for each center optical frequency.

Another aspect of the present disclosure is to provide a dual-spectral variable-based oscillation optical frequency scanning laser light source in which the optical frequency of laser light oscillating in an optical resonance unit is scanned over time as both selective variation of a transmission optical frequency band and selective variation of a resonant optical frequency occur, and a measurement device using the same and an object angle-dependent distance measurement device using propagation angle switching for each center optical frequency.

A further aspect of the present disclosure is to provide a dual-spectral variable-based oscillation optical frequency scanning laser light source which actively changes output characteristics by enabling sequential scanning of oscillation laser outputs, throughout the entire band wider than a channel band, and a measurement device using the same and an object angle-dependent distance measurement device using propagation angle switching for each center optical frequency.

A further aspect of the present disclosure is to provide a dual-spectral variable-based oscillation optical frequency scanning laser light source which enables sequential scanning of oscillation laser outputs, throughout the entire band wider than a channel band, by controlling both the scanning of optical frequency within a specific narrow channel band and the scanning of the channel band itself where the optical frequency scanning occurs, and a measurement device using the same and an object angle-dependent distance measurement device using propagation angle switching for each center optical frequency.

A further aspect of the present disclosure is to provide a dual-spectral variable-based oscillation optical frequency scanning laser light source which obtains distance information for each propagation angle of a measurement target at various positions in a space by using a optical frequency scanning laser whose center optical frequency changes over time, and a measurement device using the same and an object angle-dependent distance measurement device using propagation angle switching for each center optical frequency.

A further aspect of the present disclosure is to provide a dual-spectral variable-based oscillation optical frequency scanning laser light source in which the use of nonmechanical scanning solves the problem of shorter lifetime due to performance deterioration or repeated operations caused by external noise such as vibration, and a measurement device using the same and an object angle-dependent distance measurement device using propagation angle switching for each center optical frequency.

A further aspect of the present disclosure is to provide a dual-spectral variable-based oscillation optical frequency scanning laser light source which implements a nonmechanical scanning device for precise distance measurement at low manufacturing costs by changing the angle of propagated light in response to an electric signal without mechanical behavior, and a measurement device using the same and an object angle-dependent distance measurement device using propagation angle switching for each center optical frequency.

A further aspect of the present disclosure is to provide a dual-spectral variable-based oscillation optical frequency scanning laser light source which solves the angle limitations by performing an angle scan by optical frequency variation at an angle resolution equal to or higher than determined by the line width of a fixed optical frequency of the optical frequency scanning laser, and a measurement device using the same and an object angle-dependent distance measurement device using propagation angle switching for each center optical frequency.

A further aspect of the present disclosure is to provide a dual-spectral variable-based oscillation optical frequency scanning laser light source which enables precise distance measurement by making an angle variation caused by a laser's optical frequency scanning larger than an angle of dispersion caused by the line width of the laser's optical frequency, and a measurement device using the same and an object angle-dependent distance measurement device using propagation angle switching for each center optical frequency.

The aspects of the present disclosure are not limited to the foregoing, and other aspects not mentioned herein will be able to be clearly understood by those skilled in the art from the following description.

An embodiment of the present disclosure provides a dual-spectral variable-based oscillation optical frequency scanning laser light source comprising: an optical gain unit for generating and amplifying light; a transmission optical band variation unit for selecting a specific optical frequency band from the light generated by the optical gain unit, and varying the selected specific optical frequency band to transmit light; a resonant optical frequency variation unit for performing a frequency variation so that multiple resonant optical frequency orders within the specific optical frequency band vary over a variation range narrower than intervals between the respective orders; resonance induction units for forming an optical resonance unit which includes the optical gain unit, the transmission optical band variation unit, and the resonant optical frequency variation unit and causes selective oscillation of light having a specific resonant optical frequency within a specific transmission optical band; and a control signal unit for varying each of the transmission optical band variation unit and the resonant optical frequency variation unit.

Here, the optical frequency of laser light oscillating in an optical resonance unit is scanned over time as both selective variation of a transmission optical frequency band and selective variation of a resonant optical frequency occur by means of the control signal unit.

Furthermore, a specific transmission broad bandwidth selected by the transmission optical band variation unit to transmit light is narrower than the optical frequency range of the optical gain unit and at the same time wider than the optical frequency variation range of the resonant optical frequency variation unit, thereby increasing the coherence of laser light by an optical gain limitation effect caused by the transmission optical band selection and still maintaining the resonant optical frequency variation range without decreasing the same.

Furthermore, the time taken to vary a selectively oscillated resonant optical frequency of a specific order over a variation range and the time taken to select and vary the resonant optical frequency order discontinuously and periodically for a transmission optical bandwidth by the transmission optical band variation unit occur alternately and periodically, whereby the optical frequency of laser light oscillating in the optical resonance unit is sequentially scanned over time.

Furthermore, as the time taken to continuously vary the center optical frequency of a transmission optical band including the resonant optical frequency order is longer than the time taken to vary a selectively oscillated resonant optical frequency of a specific order over a variation range, the optical frequency of laser light oscillating in the optical resonance unit is sequentially scanned, with the optical frequency range for variation of the resonant optical frequency order being included in the optical frequency range in which the transmission optical band continuously varies.

Furthermore, the resonant optical frequency variation unit varies the resonant optical frequency of a specific order oscillated from the light source by changing intermode intervals of a longitudinal mode spectrum of multiple orders of the light source by varying the optical path length of the optical resonator.

Furthermore, the transmission optical band variation unit varies the oscillation optical frequency of a specific resonant optical frequency in a band wider than the variation range of a resonant optical frequency oscillated from the light source, by selecting a longitudinal mode of a specific order from a longitudinal mode spectrum of multiple orders of the light source by varying optical transmission and optical loss spectrum bands.

Furthermore, the transmission optical band variation unit comprises: a diffraction grating unit for dispersing incident light at different angles depending on the optical frequency of the incident light; and an angle scanning reflection unit for giving feedback on a specific optical frequency alone as the light transmitted from the diffraction grating unit is reflected at a given angle.

Another embodiment of the present disclosure provides a measurement device using a dual-spectral variable-based oscillation optical frequency scanning laser light source, the measurement device comprising: an oscillation optical frequency scanning laser light source unit which sequentially scans the optical frequency of oscillated laser light as both selective variation of an optical band by the transmission optical band variation unit and selective variation of an optical frequency by the resonant optical frequency variation unit occur; a channel scanning unit in which part of light transmitted from the oscillation optical frequency scanning laser light source unit causes different channel variations through selective variation of a specific transmission optical band; a diagnostic reflection unit in which a diagnostic target is positioned so that light is transmitted from the channel scanning unit and reflected from the diagnostic target; an optical interferometric unit which induces an optical interference signal as the light transmitted and reflected back from the diagnostic reflection unit interferes with the remaining part of the light transmitted from the oscillation optical frequency scanning laser light unit; and an optical measurement unit which obtains information on the diagnostic target from the optical interference signal transmitted from the optical interferometric unit through selective oscillation and variation of the optical frequency.

Yet another embodiment of the present disclosure provides a measurement device using a dual-spectral variable-based oscillation optical frequency scanning laser light source, the measurement device comprising: an oscillation optical frequency scanning laser light source unit which sequentially scans the optical frequency of oscillated laser light as both selective variation of an optical band by the transmission optical band variation unit and selective variation of an optical frequency by the resonant optical frequency variation unit occur; a channel scanning unit which performs an optical scan for each angle in a nonmechanical manner so that light travels through a space at different angles depending on a diffraction reflection or dispersion reflection caused by selective variation of the optical frequency band by the resonant optical frequency variation unit; a diagnostic reflection unit in which a diagnostic target is remotely positioned so that light is transmitted to a free space and reflected on the free space from the diagnostic target; an optical interferometric unit which induces an optical interference signal; and an optical measurement unit which scans and measures spatial information of the diagnostic target over time from the optical interference signal through selective oscillation and variation of the optical frequency by the resonant optical frequency variation unit, the spatial information corresponding to channels for different angles.

A further embodiment of the present disclosure provides a measurement device using a dual-spectral variable-based oscillation optical frequency scanning laser light source, the measurement device comprising: an oscillation optical frequency scanning laser light source unit which sequentially scans the optical frequency of oscillated laser light as both selective variation of an optical band by the transmission optical band variation unit and selective variation of an optical frequency by the resonant optical frequency variation unit occur; a channel scanning unit which causes multichannel information transmission and acquisition as light of different optical frequencies caused by selective variation of the optical frequency band by the resonant optical frequency variation unit is divided by optical frequency channel division and travels to optical fibers; a diagnostic reflection unit in which a diagnostic target is positioned so that light is transmitted to optical fibers and reflected on the optical fibers from the diagnostic target; an optical interferometric unit which induces an optical interference signal; and an optical measurement unit which scans and measures optical fiber information of the diagnostic target over time from the optical interference signal through selective oscillation and variation of the optical frequency by the resonant optical frequency variation unit, the optical fiber information corresponding to channels for different optical frequencies.

A further embodiment of the present disclosure provides a measurement device using a dual-spectral variable-based oscillation optical frequency scanning laser light source, the measurement device comprising: an oscillation optical frequency scanning laser light source unit which sequentially scans the optical frequency of oscillated laser light as both selective variation of an optical band by the transmission optical band variation unit and selective variation of an optical frequency by the resonant optical frequency variation unit occur; a channel scanning unit in which light transmitted from the oscillation optical frequency scanning laser light source unit causes different channel variations through selective variation of a specific transmission optical band; a diagnostic reflection unit in which a diagnostic target is positioned so that light is transmitted from the channel scanning unit and reflected from the diagnostic target; an optical detection unit which converts a variation in the intensity of the light transmitted and reflected back from the diagnostic reflection unit into an electric signal over time; and an optical measurement unit which obtains light spectrum information for each optical frequency of the diagnostic target from the variation over time of the electric signal transmitted from the optical detection unit.

A further embodiment of the present disclosure provides an object angle-dependent distance measurement device using propagation angle switching for each center optical frequency, that uses a dual-spectral variable-based oscillation optical frequency scanning laser light source, the object angle-dependent distance measurement device comprising: a optical frequency scanning laser unit which produces light whose center frequency changes continuously over time; a optical frequency-angle switching unit which propagates light transmitted from the optical frequency scanning laser unit in a space by varying the angle with the center optical frequency of the light; and an optical detection unit which converts an intensity signal of the propagated light transmitted and reflected back from a measurement target into an electric intensity signal over time, wherein the distance to the object located based on the propagation angle corresponding to the center optical frequency of the propagated light is measured by extracting distance information of the target from the electric intensity signal converted by the optical detection unit.

Here, distances are discerned by dividing into smaller units of transverse width depending on a change in the transverse position of a target, if the amount of change in the transverse position of a remote target corresponding to an angle variation caused by a change in the center optical frequency of light produced by a optical frequency scanning by the optical frequency scanning laser unit is larger than the transverse width of a target corresponding to a long-distance propagation dispersion caused by the line width of the optical frequency of light produced by a optical frequency scanning by the optical frequency scanning laser unit.

Furthermore, the object angle-dependent distance measurement device further comprises: an optical distribution unit which divides the light transmitted from the light source at a specific ratio; a reference reflection unit which forms an optical signal as a reference; and a signal processing unit which analyzes an electric intensity signal measured by the optical detection unit, which converts an intensity signal of the light transmitted and reflected back from a target into an electric intensity signal over time, into spatial information of the target, wherein the distance to the object located based on the propagation angle corresponding to the center optical frequency of the propagated light is measured by extracting distance information of the target from the electric intensity signal converted by the optical detection unit.

Furthermore, the object angle-dependent distance measurement device further comprises: an optical distribution unit which divides the light transmitted from the light source at a specific ratio; a first optical circulation unit which transmits a distributed beam of light to a specific port and transmits returned light to a third port; a second optical unit which transmits another distributed beam of light to a specific port and transmits returned light to a third port; a reference reflection unit which forms an optical signal as a reference; an optical coupling unit which couples together the beams of light transmitted from the two first and second optical circulation units; and a signal processing unit which analyzes an electric intensity signal measured by the optical detection unit, which converts an intensity signal of the light from the optical coupling unit into an electric intensity signal over time, into spatial information of the target, wherein the distance to the object located based on the propagation angle corresponding to the center optical frequency of the propagated light is measured by extracting distance information of the target from the electric intensity signal converted by the optical detection unit.

Furthermore, a time difference is generated due to an optical path difference between light reflected back from the measurement target and light returned from the reference reflection unit, light beams of different optical frequencies are transmitted simultaneously to the optical detection unit due to the generated time difference, and information is measured through an interference between the transmitted light beams of different optical frequencies.

Furthermore, the light source comprises: an optical gain unit for generating and amplifying light; a transmission optical band variation unit for selecting a specific optical frequency band from the light generated by the optical gain unit, and varying the selected specific optical frequency band to transmit light; a resonant optical frequency variation unit for performing a frequency variation so that multiple resonant optical frequency orders within the specific optical frequency band vary over a variation range narrower than intervals between the respective orders; resonance induction units for forming an optical resonance unit which includes the optical gain unit, the transmission optical band variation unit, and the resonant optical frequency variation unit and causes selective oscillation of light having a specific resonant optical frequency within a specific transmission optical band; and a control signal unit for varying each of the transmission optical band variation unit and the resonant optical frequency variation unit.

Furthermore, the optical frequency of laser light oscillating in the optical resonance unit is scanned over time as both selective variation of a transmission optical frequency band and selective variation of a resonant optical frequency occur by means of the control signal unit.

Furthermore, a specific transmission broad bandwidth selected by the transmission optical band variation unit to transmit light is narrower than the optical frequency range of the optical gain unit and at the same time wider than the optical frequency variation range of the resonant optical frequency variation unit, thereby increasing the coherence of laser light by an optical gain limitation effect caused by the transmission optical band selection and still maintaining the resonant optical frequency variation range without decreasing the same.

Furthermore, the time taken to vary a selectively oscillated resonant optical frequency of a specific order over a variation range and the time taken to select and vary the resonant optical frequency order discontinuously and periodically for a transmission optical bandwidth by the transmission optical band variation unit occur alternately and periodically, whereby the optical frequency of laser light oscillating in the optical resonance unit is sequentially scanned over time.

Furthermore, as the time taken to continuously vary the center optical frequency of a transmission optical band including the resonant optical frequency order is longer than the time taken to vary a selectively oscillated resonant optical frequency of a specific order over a variation range, the optical frequency of laser light oscillating in the optical resonance unit is sequentially scanned, with the optical frequency range for variation of the resonant optical frequency order being included in the optical frequency range in which the transmission optical band continuously varies.

Furthermore, the object angle-dependent distance measurement device comprises: an optical circulation unit which transmits light from a light source, which produces light whose center frequency changes continuously over time, to a specific port and transmits returned light to a third port; and a signal processing unit which analyzes an electric intensity signal measured by the optical detection unit, which converts a light intensity signal into an electric intensity signal over time, into spatial information of the target, wherein the distance to the object located based on the propagation angle corresponding to the center optical frequency of the propagated light is measured by extracting distance information of the target from the electric intensity signal converted by the optical detection unit.

Furthermore, the object angle-dependent distance measurement device comprises: an optical distribution unit which divides the light transmitted from the light source, which produces light whose center frequency changes continuously over time, at a specific ratio; and a signal processing unit which analyzes an electric intensity signal measured by the optical detection unit, which converts a light intensity signal into an electric intensity signal over time, into spatial information of the target, wherein the distance to the object located based on the propagation angle corresponding to the center optical frequency of the propagated light is measured by extracting distance information of the target from the electric intensity signal converted by the optical detection unit.

Furthermore, information is measured by measuring a time difference generated due to an optical path difference between light reflected back from the measurement target and light returned from the reference reflection unit.

Furthermore, a time difference is generated due to an optical path difference between light reflected back from the measurement target and light returned from the reference reflection unit, and information is measured by measuring a phase difference in an intensity-modulated signal caused by the time difference.

Furthermore, the object angle-dependent distance measurement device further comprises a reference reflection unit which forms an optical signal as a reference, wherein the reference reflection unit comprises: an optical path variation unit which compensates for a reference optical path difference by adjusting the length of the optical path; and a reflection unit which reflects back light transmitted from the optical path variation unit.

Furthermore, in order to solve the problem, which is that a time delay generated by an optical path difference is longer than an interval period of the center frequency of periodically repeated and produced laser light, or an interval period between produced pulses, or an interval period between produced signals whose intensity is modulated, and that therefore measurement is impossible even if the distance to the object is shorter than the coherence distance of the laser and the intensity of a reflection signal is higher than the intensity of a noise signal, a time delay is deliberately generated by means of the optical path variation unit, thereby shortening the time delay generated by the optical path difference than the interval period of produced laser light.

The above-described dual-spectral variable-based oscillation optical frequency scanning laser light source, and the measurement device using the same and the object angle-dependent distance measurement device using propagation angle switching for each center optical frequency according to the present disclosure have the following effects.

First, a laser light source is provided which enables sequential scanning of oscillation laser outputs, throughout the entire band wider than a channel band.

Second, it is possible to actively change output characteristics by scanning the optical frequency of laser light oscillating in an optical resonance unit over time as both selective variation of a transmission optical frequency band and selective variation of a resonant optical frequency occur.

Third, efficient measurement is enabled by actively changing output characteristics by enabling sequential scanning of oscillation laser outputs, throughout the entire band wider than a channel band.

Fourth, sequential scanning of oscillation laser outputs is enabled throughout the entire band wider than a channel band, by controlling both the scanning of optical frequency within a specific narrow channel band and the scanning of the channel band itself where the optical frequency scanning occurs.

Fifth, it is possible to efficiently obtain distance information for each propagation angle of a measurement target at various positions in a space by using a optical frequency scanning laser (light source) whose center optical frequency changes over time.

Sixth, the use of nonmechanical scanning solves the problem of shorter lifetime due to performance deterioration or repeated operations caused by external noise such as vibration.

Seventh, it is possible to implement a nonmechanical scanning device for precise distance measurement at low manufacturing costs by changing the angle of propagated light in response to an electric signal without mechanical behavior.

Eighth, it is possible to solve the angle limitations by performing an angle scan by optical frequency variation at an angle resolution equal to or higher than determined by the line width of a fixed optical frequency of the optical frequency scanning laser (light source).

Ninth, precise distance measurement is enabled by making an angle variation caused by a laser's optical frequency scanning larger than an angle of dispersion caused by the line width of the laser's optical frequency.

BRIEF DESCRIPTION OF THE DRAWINGS

FIGS. 3A and 3B are graphs of variable characteristics of an optical frequency band selectively oscillated by a transmission optical band variation unit.

FIGS. 4A and 4B are graphs of variable characteristics of an optical frequency band selectively oscillated by a resonant optical frequency variation unit.

FIGS. 23A to 23C are diagrams showing measurement characteristics of distance measurement devices when there is a time delay caused by an optical path difference.

DETAILED DESCRIPTION

Hereinafter, a dual-spectral variable-based oscillation optical frequency scanning laser light source, and a measurement device using the same and an object angle-dependent distance measurement device using propagation angle switching for each center optical frequency according to exemplary embodiments of the present disclosure will be described below.

The features and advantages of the dual-spectral variable-based oscillation optical frequency scanning laser light source, and the measurement device using the same and the object angle-dependent distance measurement device using propagation angle switching for each center optical frequency according to the present disclosure will be made clear from the following detailed descriptions of the embodiments.

Figure 1:
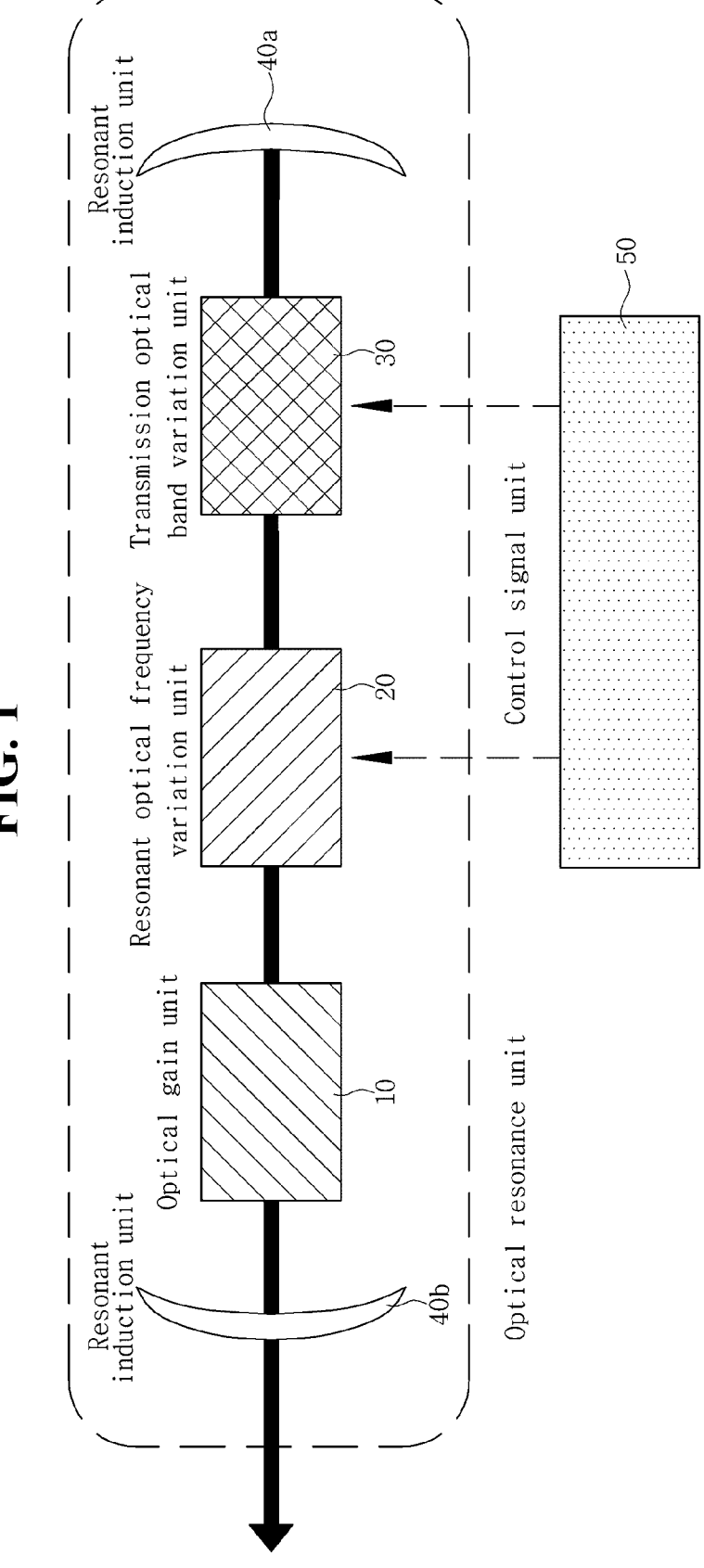
FIG. 1 is a configuration diagram of a dual-spectral variable-based oscillation optical frequency scanning laser light source according to the present disclosure.

FIG. 1 is a configuration diagram of a dual-spectral variable-based oscillation optical frequency scanning laser light source according to the present disclosure.

The dual-spectral variable-based oscillation optical frequency scanning laser light source, and the measurement device using the same according to the present disclosure are for actively change output characteristics by scanning the optical frequency of laser light oscillating in an optical resonance unit over time as both selective variation of a transmission optical frequency band and selective variation of a resonant optical frequency occur.

To this end, the present disclosure may include a component that enables sequential scanning of oscillation laser outputs, throughout the entire band wider than a channel band, by controlling both the scanning of optical frequency within a specific narrow channel band and the scanning of the channel band itself where the optical frequency scanning occurs.

As shown in FIG. 1, the dual-spectral variable-based oscillation optical frequency scanning laser light source according to the present disclosure includes: an optical gain unit 10 for generating and amplifying light over a plurality of broad optical frequency ranges; a transmission optical band variation unit 30 for selecting a specific optical frequency band from the light generated by the optical gain unit 10, and varying the selected specific optical frequency band to transmit light; a resonant optical frequency variation unit 20 for performing a frequency variation so that multiple resonant optical frequency orders within the specific optical frequency band vary over a variation range narrower than intervals between the respective orders; resonance induction units 40a and 40b for forming an optical resonance unit which includes the optical gain unit 10, the transmission optical band variation unit 30, and the resonant optical frequency variation unit 20 and causes selective oscillation of light having a specific resonant optical frequency within a specific transmission optical band; and a control signal unit 50 for varying each of the transmission optical band variation unit 30 and the resonant optical frequency variation unit 20.

Here, the optical frequency of laser light oscillating in an optical resonance unit is scanned over time as both selective variation of a transmission optical frequency band and selective variation of a resonant optical frequency occur by means of the control signal unit 50.

Moreover, a specific transmission broad bandwidth selected by the transmission optical band variation unit 30 to transmit light is narrower than the optical frequency range of the optical gain unit 10 and at the same time wider than the optical frequency variation range of the resonant optical frequency variation unit 20, thereby increasing the coherence of laser light by an optical gain limitation effect caused by the transmission optical band selection and still maintaining the resonant optical frequency variation range without decreasing the same.

In addition, the resonance induction units 40a and 40b may be disposed by an additional optical element such as an optical fiber coupler or a spatial beam splitter so that an optical resonator structure of the resonance induction units 40a and 40b forms a loop structure.

Furthermore, the resonance induction units 40a and 40b may be disposed by an additional optical element such as an optical fiber coupler or a partially reflecting mirror so that an optical resonator structure of the resonance induction units 40a and 40b forms a linear structure.

Furthermore, the optical resonance unit may be a rare earth-doped fiber amplifier, a simulated Raman fiber amplifier, or a semiconductor optical amplifier.

Furthermore, the resonant optical frequency variation unit 20 may be an electro-optic phase modulator, an electro-optic refractive index changer, or a liquid crystal retarder.

Furthermore, the transmission optical band variation unit 30 may be an acousto-optic tunable filter or a Fabry-Perot tunable filter.

Furthermore, the transmission optical band variation unit 30 may include: a diffraction grating unit for dispersing incident light at different angles depending on the optical frequency of the incident light; and an angle scanning reflection unit for giving feedback on a specific optical frequency alone as the light transmitted from the diffraction grating unit is reflected at a given angle.

A spectrum of the above dual-spectral variable-based oscillation optical frequency scanning laser light source according to the present disclosure will be described below.

Figure 2A:
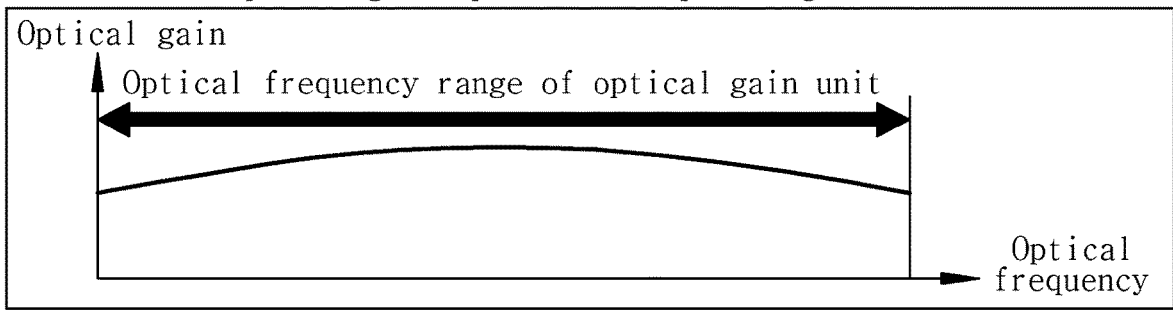
FIGS. 2A to 2C are spectral diagrams of the dual-spectral variable-based oscillation optical frequency scanning laser light source according to the present disclosure.
Figure 2B:
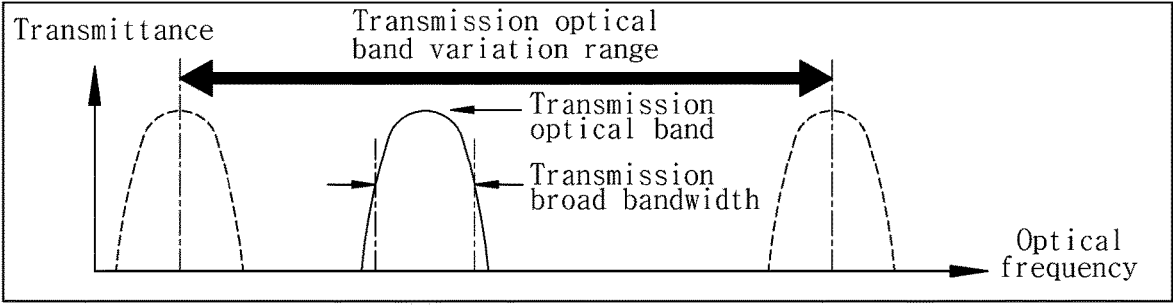
Figure 2C:
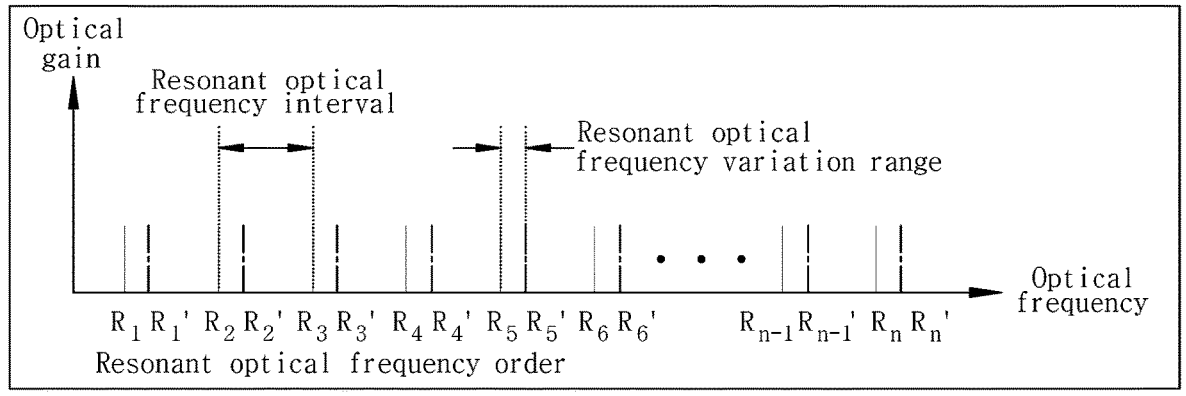

FIGS. 2A to 2C are spectral diagrams of the dual-spectral variable-based oscillation optical frequency scanning laser light source according to the present disclosure.

FIG. 2A shows an optical gain spectrum of the optical gain unit 10, which extends over a broad optical frequency range in which light is generated and at the same time amplified.

FIG. 2B shows an optical transmittance spectrum of the transmission optical band variation unit 30, in which the transmission optical band variation unit 30 selects only a specific band from the optical frequency range of the optical gain unit 10 to transmit light, and the transmission broad bandwidth is narrower than the optical frequency range of the optical gain unit 10.

FIG. 2C shows a resonant optical frequency spectrum of the optical resonance unit formed by the resonance induction units 40a and 40b, in which oscillation is permitted only on a resonant optical frequency order that is inversely proportional to an integer multiple of the length of the optical resonance unit.

FIGS. 3A and 3B are graphs of variable characteristics of an optical frequency band selectively oscillated by a transmission optical band variation unit.

FIG. 3A shows selective oscillation of optical frequency output, and FIG. 3B shows variation of an optical frequency band selectively oscillated by the transmission optical band variation unit 30.

The selectively oscillated optical frequency (D) is determined by the resonant optical frequency spectra of the optical gain unit (A), transmission optical band variation unit (B), and optical resonance unit (C).

The transmission optical band selected by the transmission optical band variation unit 30 includes at least one resonant optical frequency order.

When the transmission optical band variation unit 30 operates, the optical frequency band is changed, and this means that the selected resonant optical frequency order is changed. Accordingly, the selectively oscillated laser optical frequency band may be changed through transmission optical band variation.

FIGS. 4A and 4B are graphs of variable characteristics of an optical frequency band selectively oscillated by a resonant optical frequency variation unit.

FIG. 4A shows selective oscillation of optical frequency output, and FIG. 4B shows variation of an optical frequency band selectively oscillated by the resonant optical frequency variation unit 20.

When the resonant optical frequency variation unit 20 operates, the length of the optical resonance unit is changed.

The resonant optical frequency spectrum is changed due to the change in the length of the optical resonance unit, and this means the optical frequency of the same resonant optical frequency order itself is changed.

As the optical frequency of the optical resonant frequency order is changed, the selectively oscillated optical frequency is changed. Accordingly, the selectively oscillated laser optical frequency may be changed through resonant optical frequency variation.

The resonant optical frequency variation unit 20 varies the resonant optical frequency of a specific order oscillated from the light source by changing intermode intervals of a longitudinal mode spectrum of multiple orders of the light source by varying the optical path length of the optical resonator.

The transmission optical band variation unit 30 varies the oscillation optical frequency of a specific resonant optical frequency in a band wider than the variation range of a resonant optical frequency oscillated from the light source, by selecting a longitudinal mode of a specific order from a longitudinal mode spectrum of multiple orders of the light source by varying optical transmission and optical loss spectrum bands.

Figure 5A:
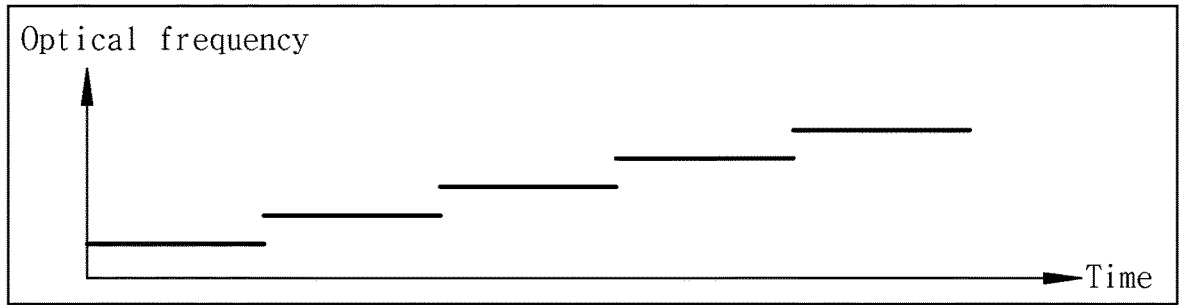
FIGS. 5A to 5C are graphs showing principles of sequential variation.
Figure 5B:
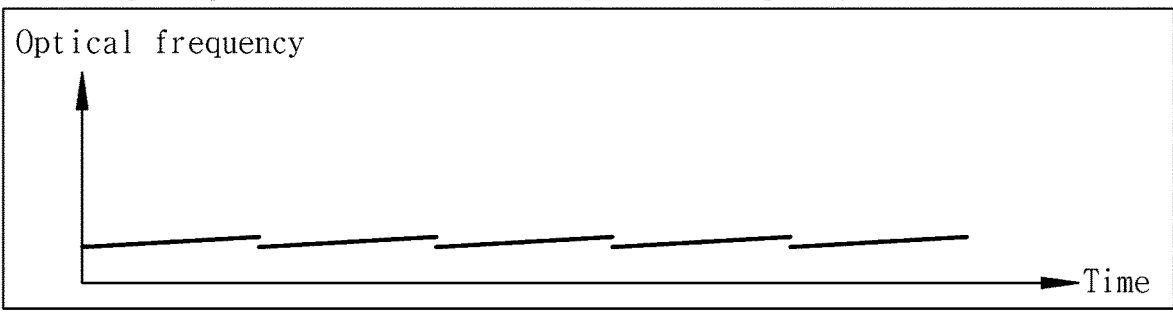
Figure 5C:
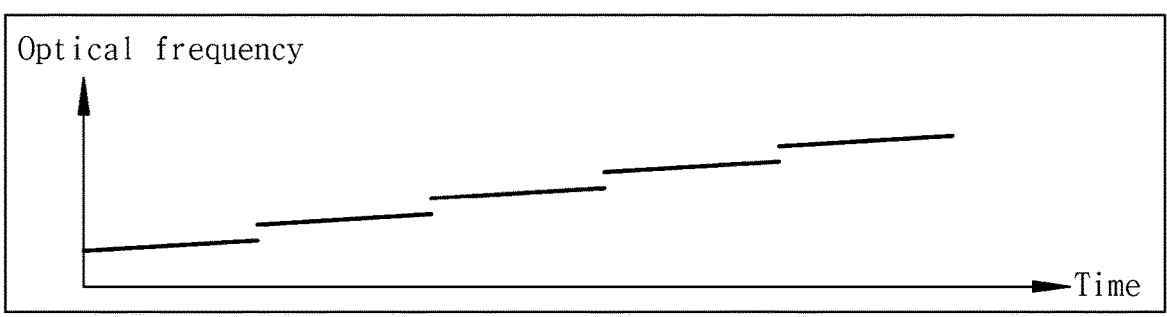

FIGS. 5A to 5C are graphs showing principles of sequential variation.

FIG. 5A shows that a single operation of the transmission optical band variation unit 30 induces a change of the resonant optical frequency order alone.

FIG. 5B shows that a single operation of the resonant optical frequency variation unit 20 induces a change of the resonant optical frequency spectrum, and that the optical frequency of the same resonant optical frequency order changes and therefore a continuous optical frequency variation occurs.

FIG. 5C shows that the transmission optical band variation unit 30 and the resonant optical frequency variation unit 20 are sequentially operated, a change of the resonant optical frequency order and a change of the optical frequency spectrum occur alternately. Accordingly, an optical frequency scan is possible while changing the optical frequency mode.

Figure 6A:
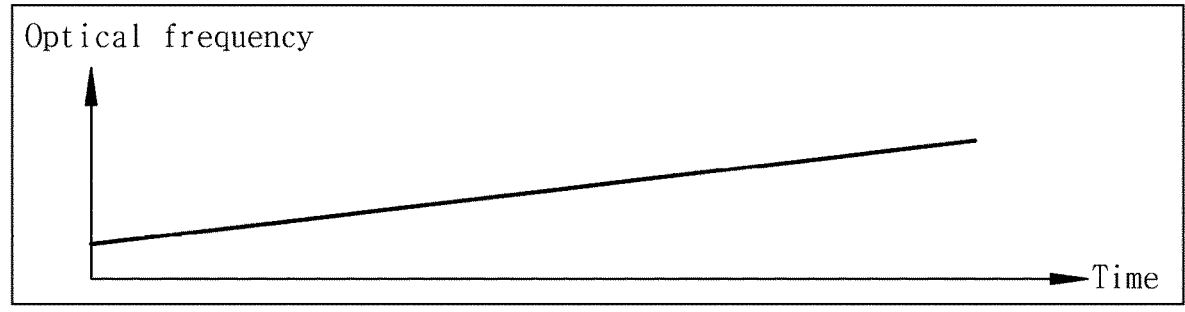
FIGS. 6A to 6C are graphs showing principles of continuous variation.
Figure 6B:
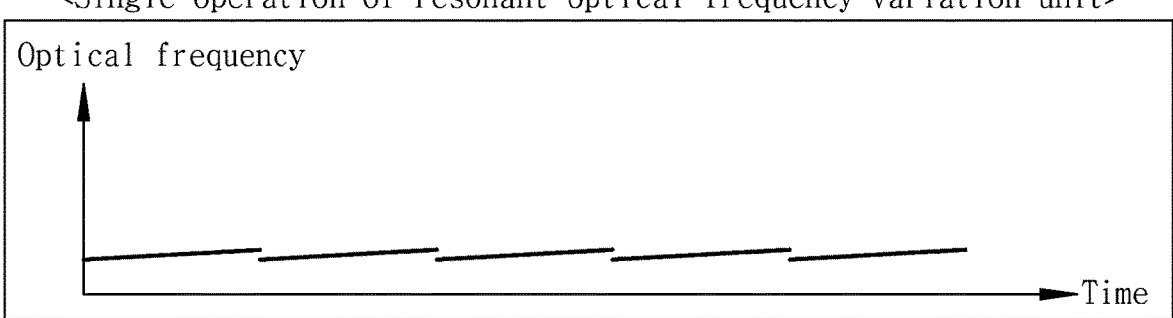
Figure 6C:
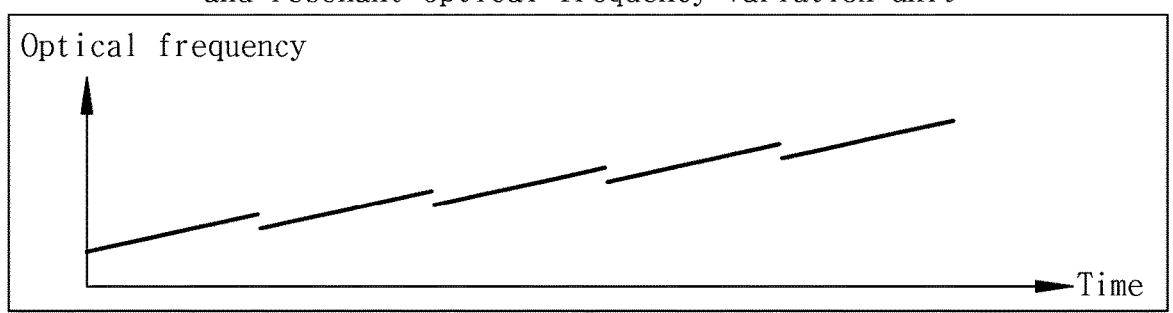

FIGS. 6A to 6C are graphs showing principles of continuous variation.

FIG. 6A shows that the transmission band is continuously changeable using the transmission optical band variation unit 30.

FIG. 6B shows that a single operation of the resonant optical frequency variation unit 20 induces a change of the resonant optical frequency spectrum, and that the optical frequency of the same resonant optical frequency order changes and therefore a continuous optical frequency variation occurs.

FIG. 6C shows that, when the transmission optical band variation unit 30 and the resonant optical frequency variation unit 20 are simultaneously operated, a change of the resonant optical frequency order and a change of the optical frequency spectrum occur simultaneously.

Accordingly, an optical frequency scan is possible while changing the resonant optical frequency order.

Figure 7:
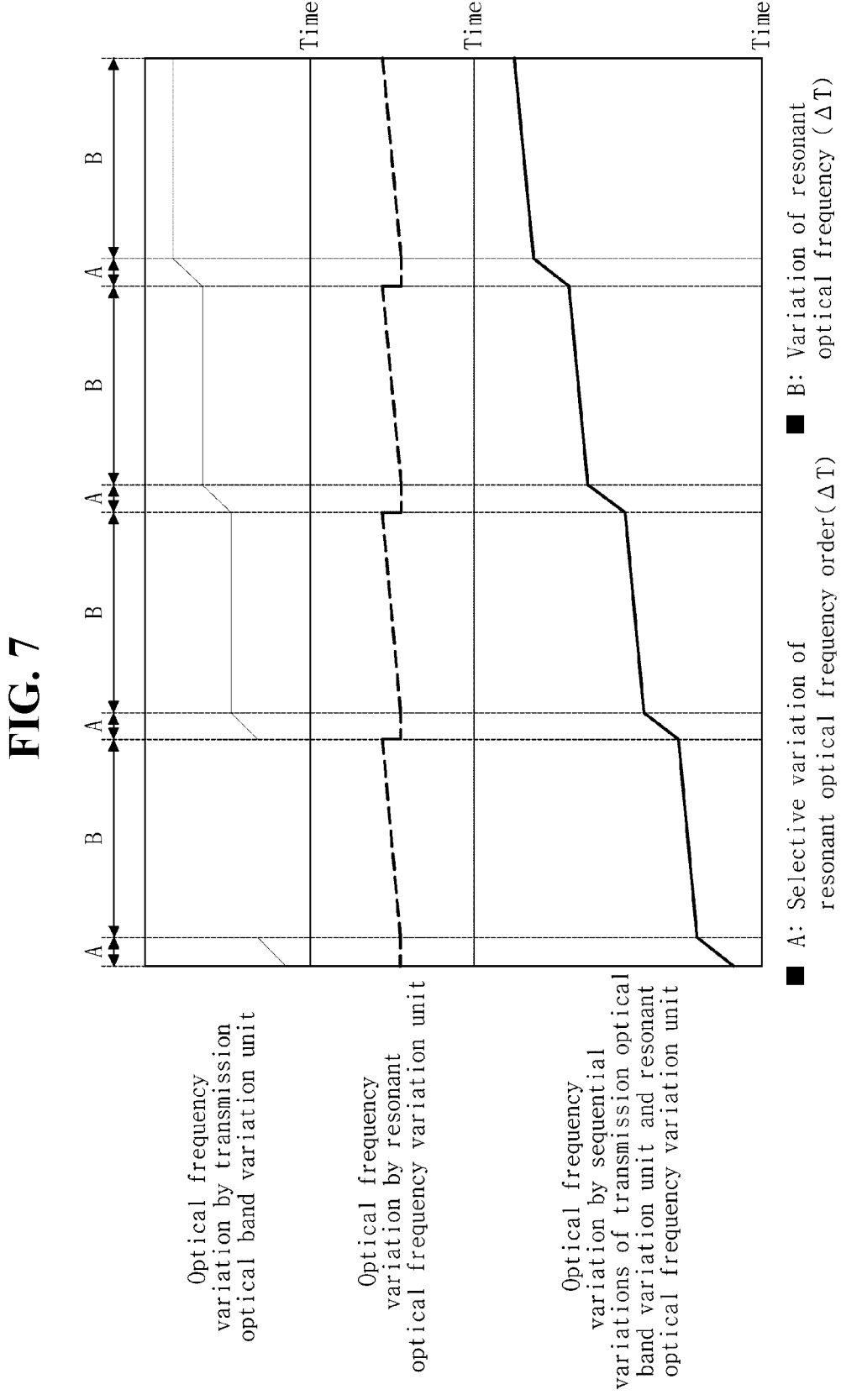
FIG. 7 is a graph showing sequential variable characteristics.

FIG. 7 is a graph showing sequential variable characteristics.

The time taken to vary a selectively oscillated resonant optical frequency of a specific order over a variation range and the time taken to select and vary the resonant optical frequency order discontinuously and periodically for a transmission optical bandwidth by the transmission optical band variation unit occur alternately and periodically, whereby the optical frequency of laser light oscillating in the optical resonance unit is sequentially scanned over time.

In sequential variation, variations occur sequentially and alternately regardless of the difference in amount between ΔT and Δt. That is, selective variation of the resonant optical frequency order by the transmission optical band variation unit 30 occurs first, and then variation of the resonant optical frequency by the resonant optical frequency variation unit 20 occurs.

Accordingly, the laser optical frequency is sequentially scanned over time.

Figure 8:
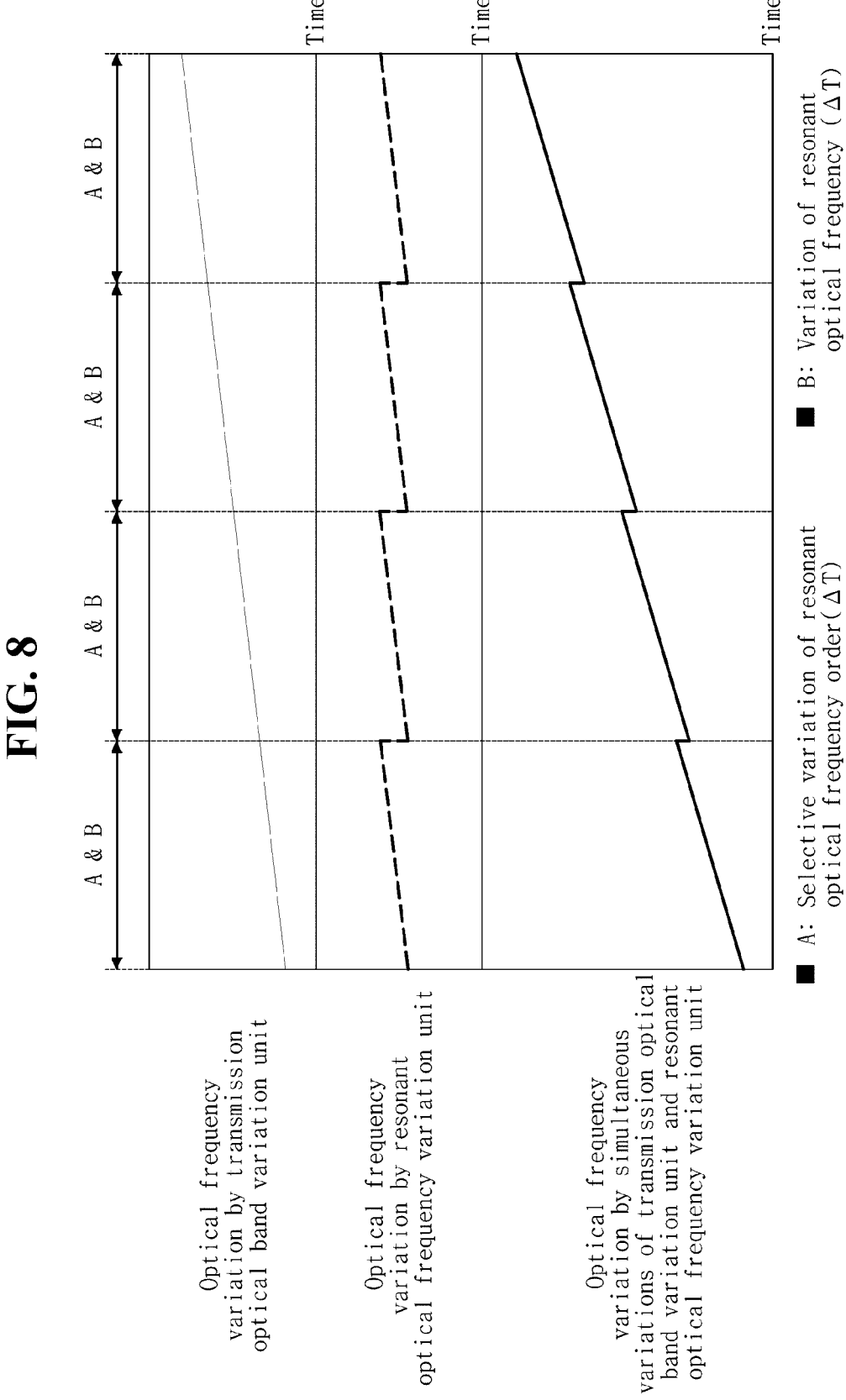
FIG. 8 is a graph showing simultaneous variable characteristics.

FIG. 8 is a graph showing simultaneous variable characteristics.

As the time taken to continuously vary the center optical frequency of a transmission optical band including the resonant optical frequency order is longer than the time taken to vary a selectively oscillated resonant optical frequency of a specific order over a variation range, the optical frequency of laser light oscillating in the optical resonance unit is sequentially scanned, with the optical frequency range for variation of the resonant optical frequency order being included in the optical frequency range in which the transmission optical band continuously varies.

In simultaneous variation, selective variation of the resonant optical frequency order and variation of the resonant optical frequency occur simultaneously.

In this instance, the selective variation ΔT of the resonant optical frequency is longer than the time Δt during which the resonant optical frequency variation occurs, the variation range of the resonant optical frequency of a specific order needs to be always included in the transmission optical band in which continuous variation occurs.

Accordingly, the laser optical frequency is sequentially scanned over time.

FIGS. 9 to 12 are block diagrams of a measurement device using a light source according to the present disclosure.

Figure 9:
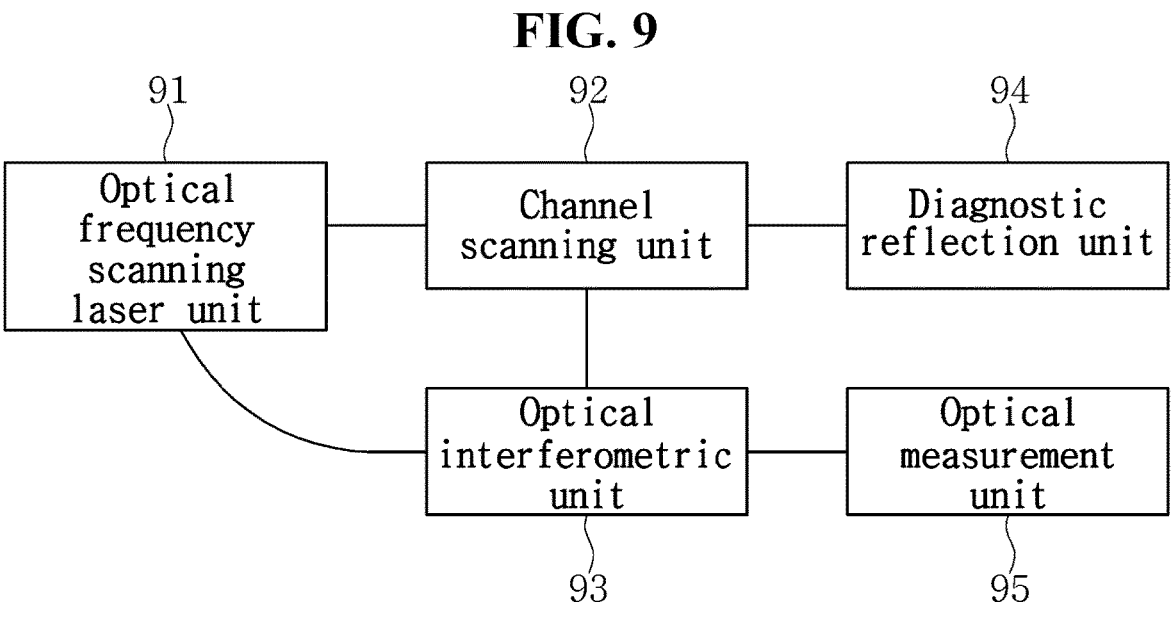
FIGS. 9 to 12 are block diagrams of a measurement device using a light source according to the present disclosure.

FIG. 9 shows an example of a measurement device using a light source according to the present disclosure. The measurement device includes: an oscillation optical frequency scanning laser light source unit 91 which sequentially scans the optical frequency of oscillated laser light as both selective variation of an optical band by the transmission optical band variation unit 30 and selective variation of an optical frequency by the resonant optical frequency variation unit 20 occur; a channel scanning unit 92 in which part of light transmitted from the oscillation optical frequency scanning laser light source unit 91 causes different channel variations through selective variation of a specific transmission optical band; a diagnostic reflection unit 94 in which a diagnostic target is positioned so that light is transmitted from the channel scanning unit 92 and reflected from the diagnostic target; an optical interferometric unit 93 which induces an optical interference signal as the light transmitted and reflected back from the diagnostic reflection unit 94 interferes with the remaining part of the light transmitted from the oscillation optical frequency scanning laser light unit 91; and an optical measurement unit 95 which obtains information on the diagnostic target from the optical interference signal transmitted from the optical interferometric unit 93 through selective oscillation and variation of the optical frequency.

Figure 10:
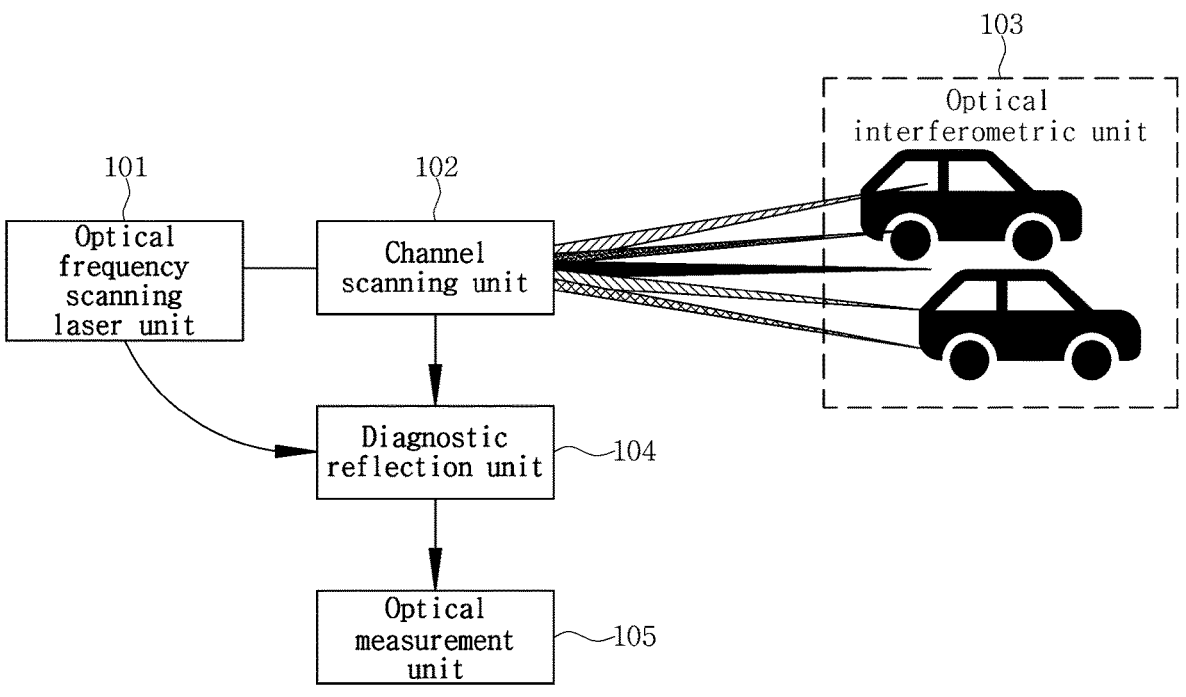

FIG. 10 shows an example of an optical measurement device application (LiDAR) using a light source according to the present disclosure. The optical measurement device includes: an oscillation optical frequency scanning laser light source unit 101 which sequentially scans the optical frequency of oscillated laser light as both selective variation of an optical band by the transmission optical band variation unit 30 and selective variation of an optical frequency by the resonant optical frequency variation unit 20 occur; a channel scanning unit 102 which performs an optical scan for each angle in a nonmechanical manner so that light travels through a space at different angles depending on a diffraction reflection or dispersion reflection caused by selective variation of the optical frequency band by the resonant optical frequency variation unit 20; a diagnostic reflection unit 103 in which a diagnostic target is remotely positioned so that light is transmitted to a free space and reflected on the free space from the diagnostic target; an optical interferometric unit 104 which induces an optical interference signal; and an optical measurement unit 105 which scans and measures spatial information over time from the optical interference signal through selective oscillation and variation of the optical frequency by the resonant optical frequency variation unit 20, the spatial information including the distance to the diagnostic target and the shape, distance, speed, or vibration of the diagnostic target, corresponding to channels for different angles.

Figure 11:
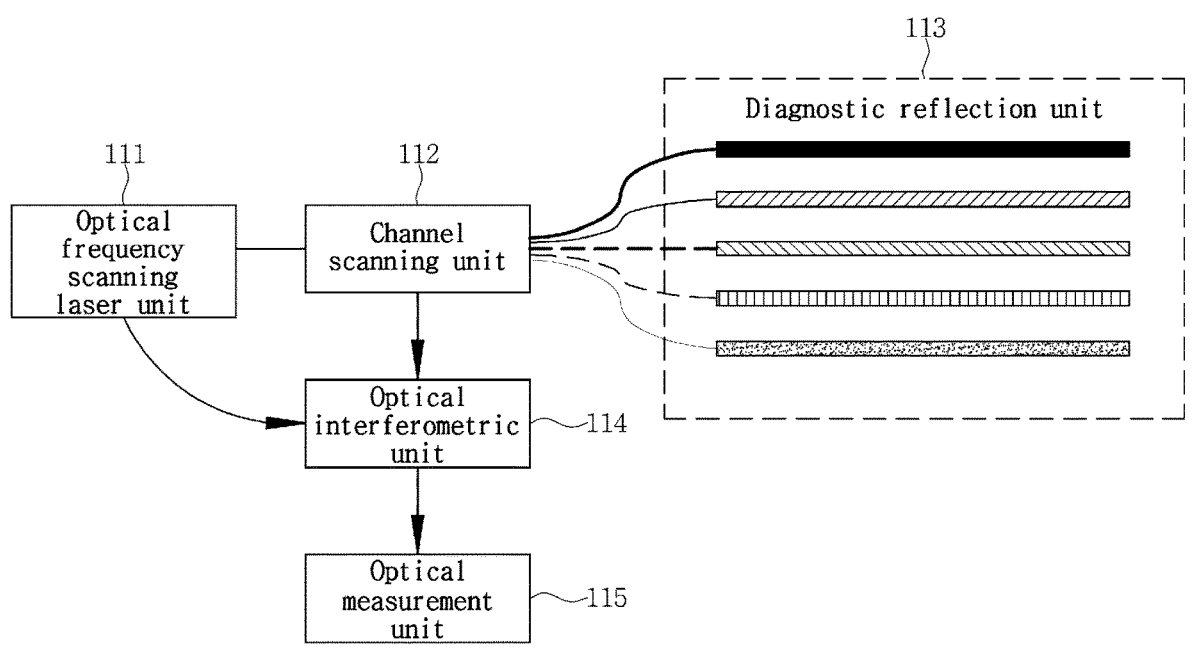

FIG. 11 shows an example of an optical measurement device (WDL, OFDR, and fiber optic) using a light source according to the present disclosure. The optical measurement device includes: an oscillation optical frequency scanning laser light source unit 111 which sequentially scans the optical frequency of oscillated laser light as both selective variation of an optical band by the transmission optical band variation unit and selective variation of an optical frequency by the resonant optical frequency variation unit 20 occur; a channel scanning unit 112 which induces multichannel information transmission and acquisition as light of different optical frequencies caused by selective variation of the optical frequency band by the resonant optical frequency variation unit 20 is divided by optical frequency channel division and travels to optical fibers; a diagnostic reflection unit 113 in which a diagnostic target is positioned so that light is transmitted to optical fibers and reflected on the optical fibers from the diagnostic target; an optical interferometric unit 114 which induces an optical interference signal; and an optical measurement unit 115 which scans and measures optical fiber information over time from the optical interference signal through selective oscillation and variation of the optical frequency by the resonant optical frequency variation unit 20, the optical fiber information including the distance to the diagnostic target and the pressure, temperature, tension, or vibration of the diagnostic target, corresponding to channels for different optical frequencies.

Figure 12:
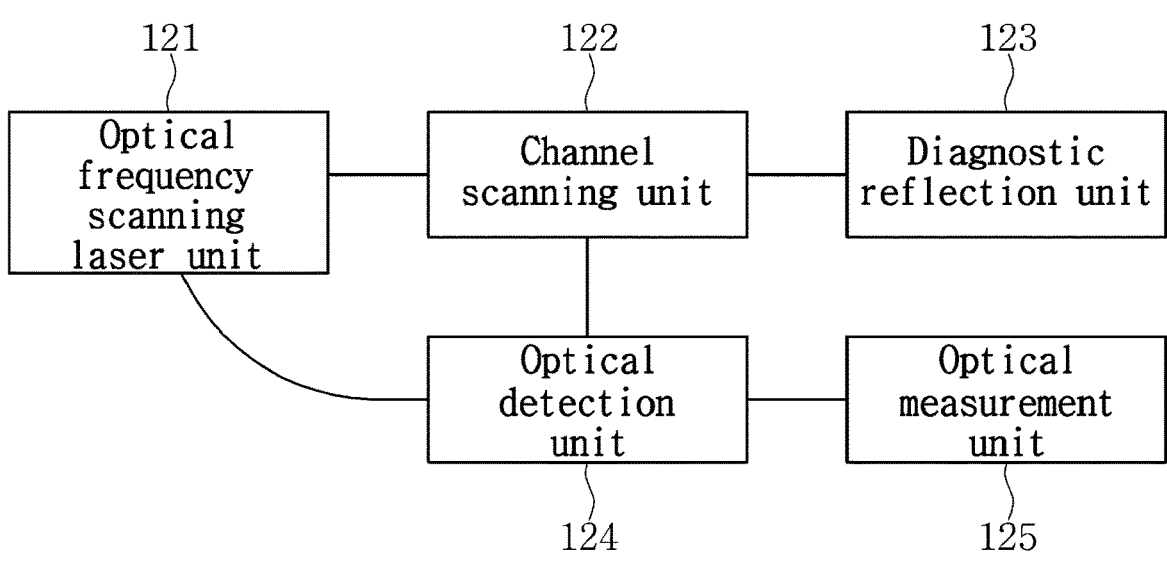

FIG. 12 shows another example of an optical measurement device using a light source according to the present disclosure. The optical measurement device includes: an oscillation optical frequency scanning laser light source unit 121 which sequentially scans the optical frequency of oscillated laser light as both selective variation of an optical band by the transmission optical band variation unit 30 and selective variation of an optical frequency by the resonant optical frequency variation unit 20 occur; a channel scanning unit 122 in which light transmitted from the oscillation optical frequency scanning laser light source unit 121 causes different channel variations through selective variation of a specific transmission optical band; a diagnostic reflection unit 123 in which a diagnostic target is positioned so that light is transmitted from the channel scanning unit 122 and reflected from the diagnostic target; an optical detection unit 124 which converts a variation in the intensity of the light transmitted and reflected back from the diagnostic reflection unit 123 into an electric signal over time; and an optical measurement unit 125 which obtains light spectrum information for each optical frequency of the diagnostic target from the variation over time of the electric signal transmitted from the optical detection unit 124.

Hereinafter, an object angle-dependent distance measurement device using propagation angle switching for each center optical frequency, that uses a dual-spectral variable-based oscillation optical frequency scanning laser light source according to the present disclosure, will be described in detail.

Figure 13:
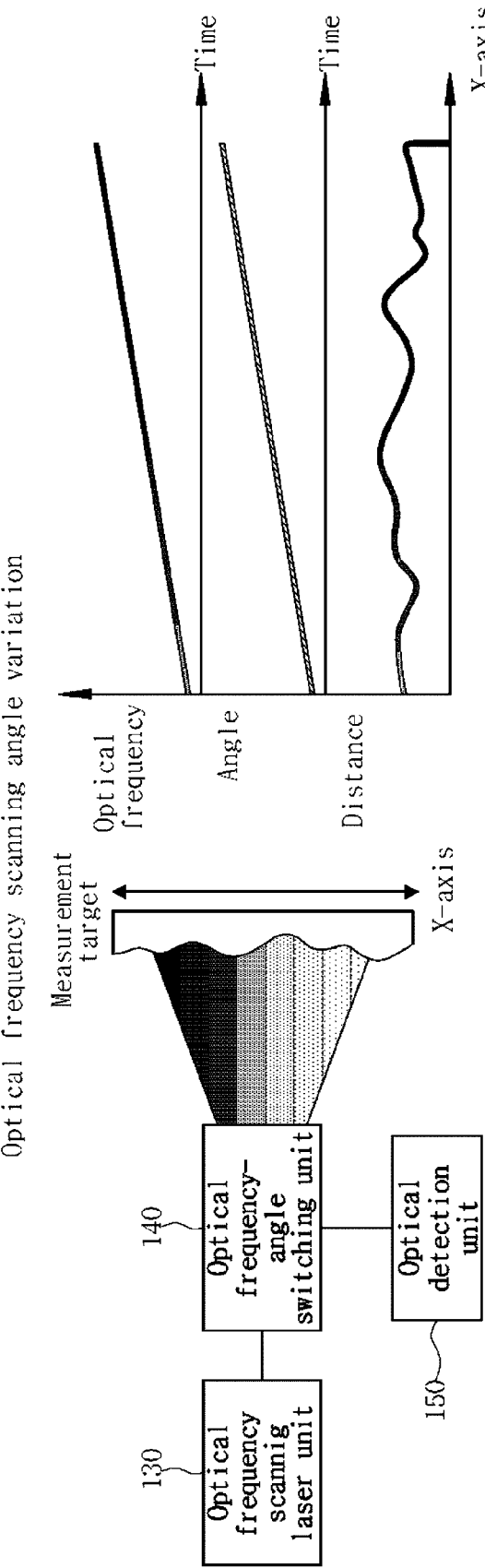
FIG. 13 is a block diagram of an object angle-dependent distance measurement device using propagation angle switching for each center optical frequency of a optical frequency scanning laser (light source) according to the present disclosure.

FIG. 13 is a block diagram of an object angle-dependent distance measurement device using propagation angle switching for each center optical frequency of a optical frequency scanning laser (light source) according to the present disclosure.

The object angle-dependent distance measurement device using propagation angle switching for each center optical frequency, that uses a dual-spectral variable-based oscillation optical frequency scanning laser light source according to the present disclosure, allows for obtaining distance information for each propagation angle of a measurement target at various positions in a space by using a optical frequency scanning laser whose center optical frequency changes over time.

To this end, the present disclosure may include a component for solving the angle limitations by performing an angle scan by optical frequency variation at an angle resolution equal to or higher than determined by the line width of a fixed optical frequency of the optical frequency scanning laser.

The present disclosure may include a component for enabling precise distance measurement by making an angle variation caused by a laser's optical frequency scanning larger than an angle of dispersion caused by the line width of the laser's optical frequency.

The optical frequency scanning laser is a laser light source whose center optical frequency changes over time, which has been primarily used in short-range measurement technologies for surface profiles or single layers, such as frequency-domain optical coherence profilometry and optical coherence tomography.

The present disclosure involves applying the optical frequency scanning laser as a component in which the angle of propagated light changes passively depending only on central optical frequency which means the optical frequency of incident light, in which optical frequency domain may be switched to angular domain, which may be implemented based on a chromatic dispersion component.

The chromatic dispersion component is a passive component such as a prism or a diffraction grating, which is advantageous over active components such as an all-optical defector or an acousto-optical deflector in that it requires no additional electric signal and can be implemented in an economical manner.

Accordingly, in order to obtain distance information for each propagation angle of a measurement target at various positions in a space, a distance measurement technique based on an angle variation for each transition optical frequency using a optical frequency scanning laser may be used to obtain distance information of a remote object based on a passive propagation angle scanning component.

In the following description, the optical frequency scanning laser (light source) is basically a dual-spectral variable-based oscillation optical frequency scanning laser light source according to the present disclosure as illustrated in FIG. 1.

As in FIG. 13, an object angle-dependent distance measurement device using propagation angle switching for each center optical frequency, that uses a dual-spectral variable-based oscillation optical frequency scanning laser light source according to the present disclosure, includes: a optical frequency scanning laser unit 130 which produces light whose center frequency changes continuously over time; a optical frequency-angle switching unit 140 which propagates light transmitted from the optical frequency scanning laser unit 130 in a space by varying the angle with the center optical frequency of the light; and an optical detection unit 150 which converts an intensity signal of the propagated light transmitted and reflected back from a measurement target into an electric intensity signal over time, wherein the distance to the object located based on the propagation angle corresponding to the center optical frequency of the propagated light is measured by extracting distance information of the target from the electric intensity signal converted by the optical detection unit 150.

The object angle-dependent distance measurement device using propagation angle switching for each center optical frequency, that uses a dual-spectral variable-based oscillation optical frequency scanning laser light source according to the present disclosure, thus constructed has the following dispersion angle characteristics.

Figure 14:
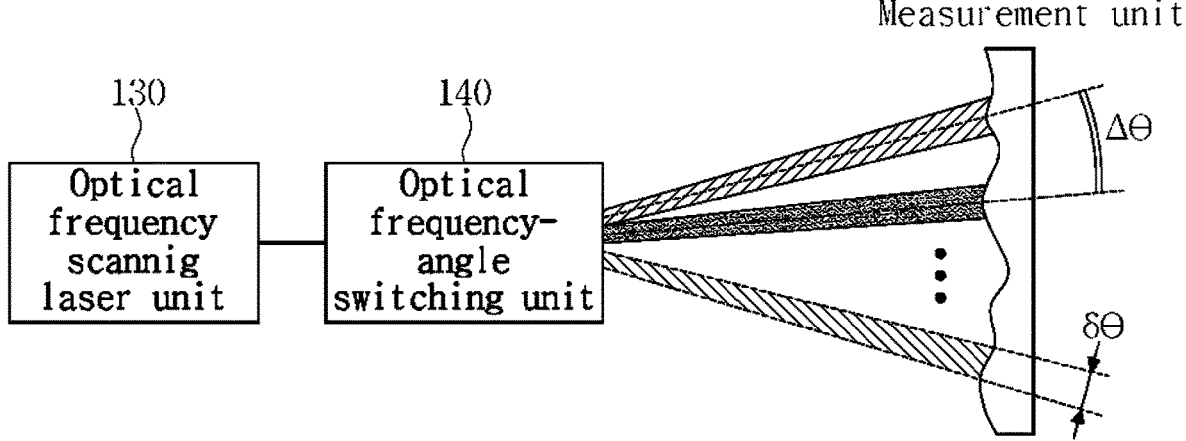
FIG. 14 is a block diagram showing dispersion angle characteristics according to the present disclosure.

FIG. 14 is a diagram showing dispersion angle characteristics according to the present disclosure.

The object angle-dependent distance measurement device using propagation angle switching for each center optical frequency of a optical frequency scanning laser according to the present disclosure is capable of discern distances by dividing into smaller units of transverse width depending on a change in the transverse position of a target, if the amount of change in the transverse position of a remote target corresponding to an angle variation caused by a change in the center optical frequency of light produced by a optical frequency scanning by the optical frequency scanning laser unit 130 is larger than the transverse width of a target corresponding to a long-distance propagation dispersion caused by the line width of the optical frequency of light produced by a optical frequency scanning by the optical frequency scanning laser unit 130.

The angle $\delta\theta$ of dispersion is caused by the line width $\delta\lambda$ of the optical frequency of the laser. The angle variation $\Delta\theta$ caused by the laser optical frequency scanning $\Delta\lambda$ should be larger than the angle of dispersion $\delta\theta < \Delta\theta$.

Figure 15:
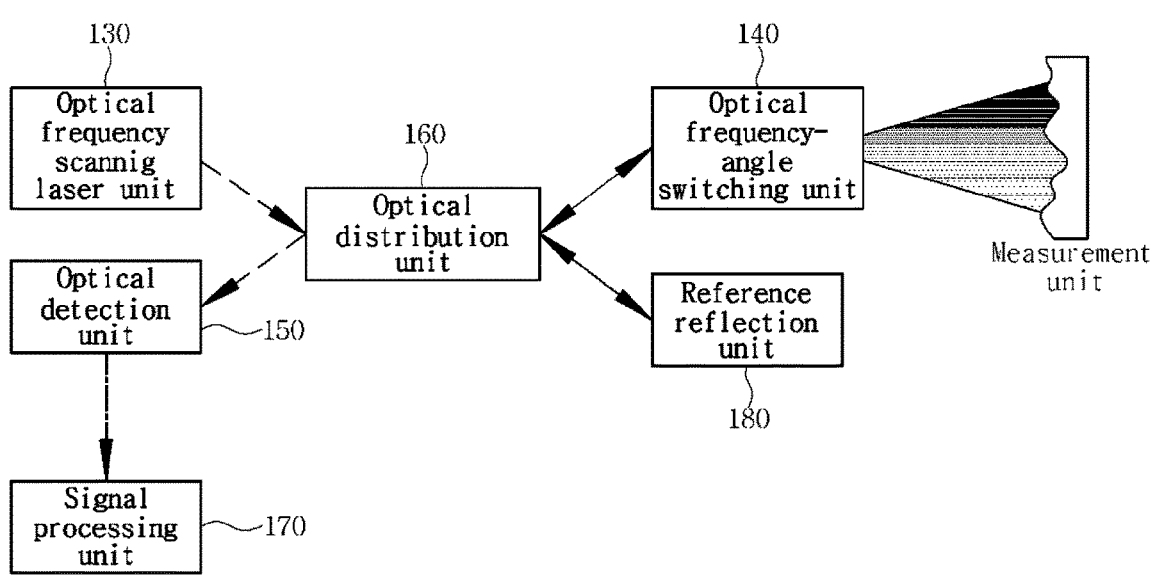
FIG. 15 is a block diagram of a distance measurement device according to another embodiment of the present disclosure.

FIG. 15 is a block diagram of a distance measurement device according to another embodiment of the present disclosure.

FIG. 15 depicts a distance measurement device according to the present disclosure applied to an FMCW Michelson structure. The distance measurement device includes a optical frequency scanning laser unit 130 which produces light whose center frequency changes continuously over time; an optical distribution unit 160 which divides the light transmitted from the optical frequency scanning laser unit 130 at a specific ratio; a optical frequency-angle switching unit 140 which propagates light in a space by varying the angle with the center optical frequency of the light; a reference reflection unit 180 which forms an optical signal as a reference; an optical detection unit 150 which converts an intensity signal of the light transmitted and reflected back from a target into an electric intensity signal over time; and a signal processing unit 170 which analyzes a measured electric intensity signal into spatial information of the target, wherein the distance to the object located based on the propagation angle corresponding to the center optical frequency of the propagated light is measured by extracting distance information of the target from the electric intensity signal converted by the optical detection unit 150.

Figure 16:
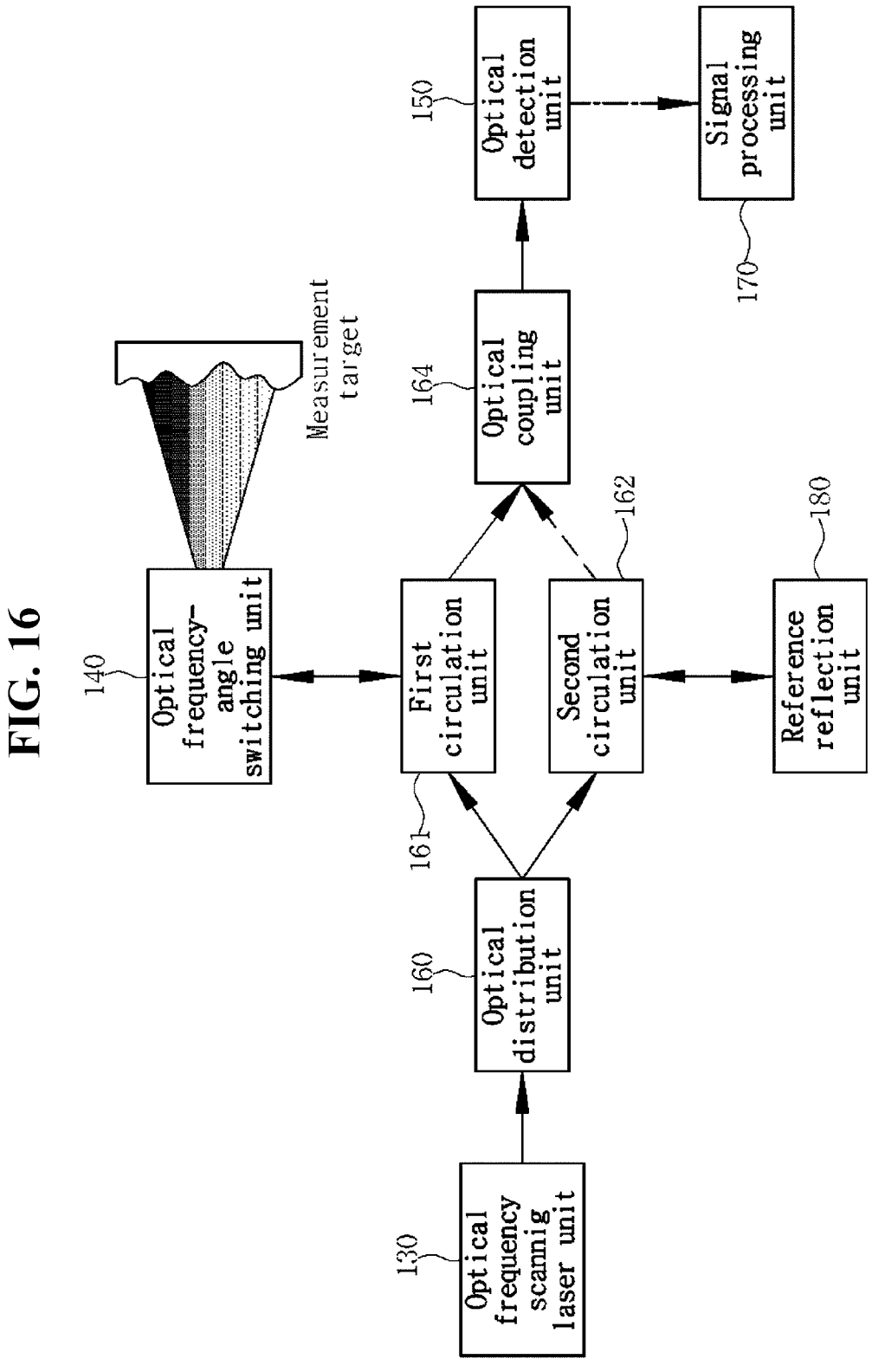
FIG. 16 is a block diagram of a distance measurement device according to yet another embodiment of the present disclosure.

FIG. 16 is a block diagram of a distance measurement device according to yet another embodiment of the present disclosure.

FIG. 16 depicts a distance measurement device according to the present disclosure applied to an FMCW Mach-Zehnder structure. The distance measurement device includes: a optical frequency scanning laser unit 130 which produces light whose center frequency changes continuously over time; an optical distribution unit 160 which divides the light transmitted from the optical frequency scanning laser unit 130 at a specific ratio; a first optical circulation unit 161 which transmits a distributed beam of light to a specific port and transmits returned light to a third port; a second optical unit 162 which transmits another distributed beam of light to a specific port and transmits returned light to a third port; a optical frequency-angle switching unit 140 which propagates light in a space by varying the angle with the center optical frequency of the light; a reference reflection unit 180 which forms an optical signal as a reference; an optical coupling unit 164 which couples together the beams of light transmitted from the two first and second optical circulation units 161 and 162; an optical detection unit 150 which converts an intensity signal of the light from the optical coupling unit 164 into an electric intensity signal over time; and a signal processing unit 170 which analyzes a measured electric intensity signal into spatial information of the target, wherein the distance to the object located based on the propagation angle corresponding to the center optical frequency of the propagated light is measured by extracting distance information of the target from the electric intensity signal converted by the optical detection unit 150.

Figure 17:
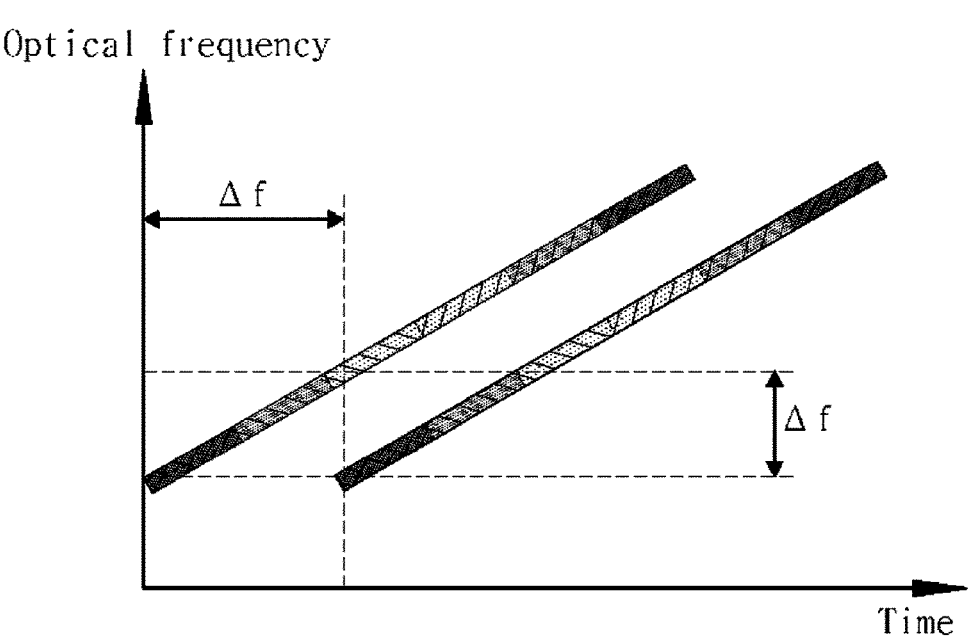
FIG. 17 is a diagram showing an FMCW principle.

FIG. 17 is a diagram showing an FMCW principle.

A time difference may be generated due to an optical path difference between light reflected back from a target and light returned from the reference reflection unit 180, light beams of different optical frequencies may be transmitted simultaneously to the optical detection unit 150 due to the generated time difference, and information may be measured through an interference between the transmitted light beams of different optical frequencies.

That is, light is produced as the center frequency of the laser changes periodically, and signals reflected back from a reference reflection arm and an object have a time difference Δt.

An interference occurs between the two signals due to the time difference, and the distance to the object may be measured by measuring the interference frequency Δf.

In an embodiment of the present disclosure, the optical frequency scanning laser unit 130 may be based on, but not limited to, an external resonator diode laser or a semiconductor laser for carrier transmission or rare-earth doping optical fibers.

Figure 18:
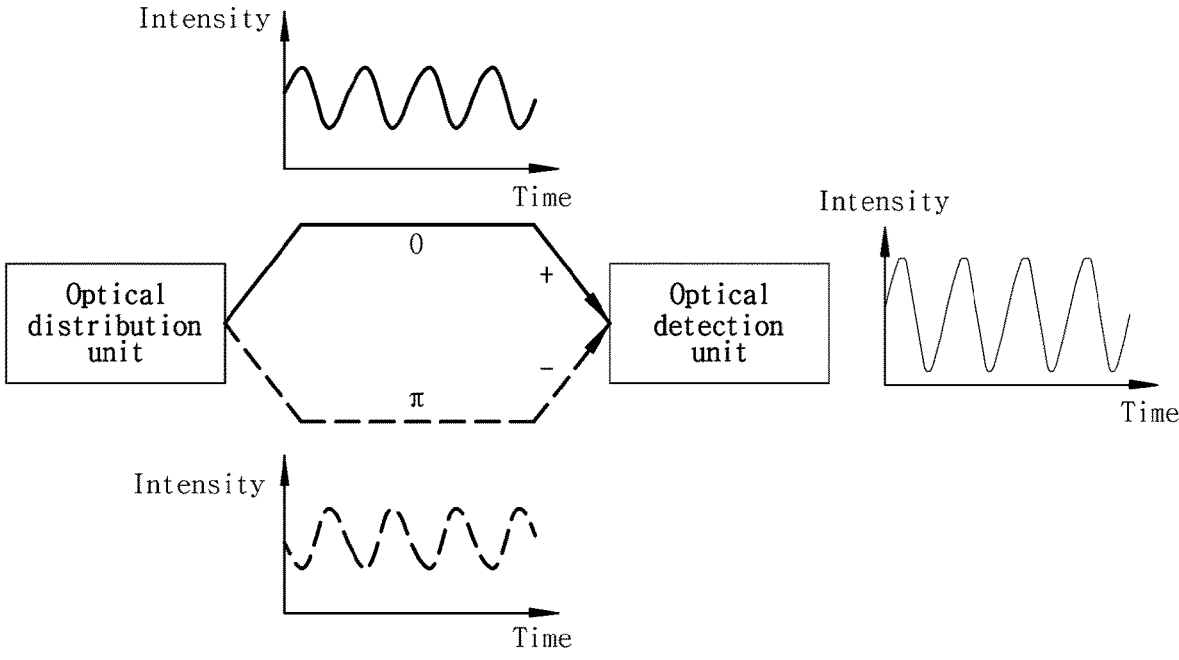
FIG. 18 is a diagram showing an example of balanced light detection characteristics and a distance measurement device therefor.

FIG. 18 is a diagram showing an example of balanced light detection characteristics and a distance measurement device therefor.

As shown in FIG. 18, an optical signal passed through the optical distribution unit is divided into two signals that are out of phase by 180 degrees, and a balanced light detection unit measures the two signals by two different optical detectors, in which case common electric noise is suppressed by the balanced light detection unit.

Figure 19:
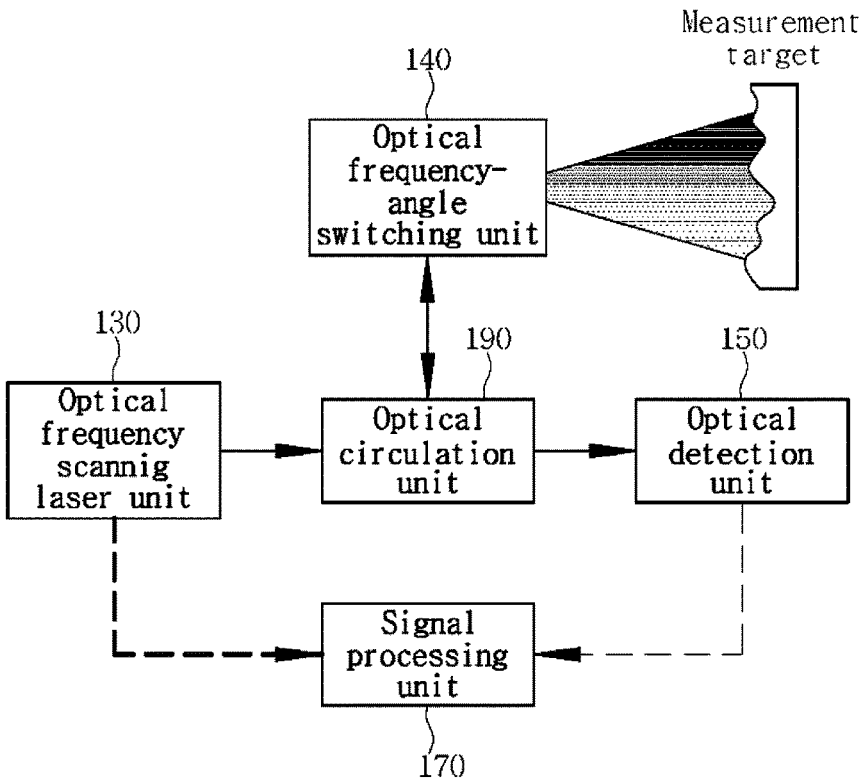
FIG. 19 is a block diagram showing a distance measurement device according to a further embodiment of the present disclosure.

FIG. 19 is a block diagram showing a distance measurement device according to a further embodiment of the present disclosure.

FIG. 19 shows a distance measurement device with respect to ToF and AMCW electric signals. The distance measurement device includes: a optical frequency scanning laser unit 130 which produces light whose center frequency changes continuously over time; an optical circulation unit 190 which transmits light to a specific port and transmits returned light to a third port; a optical frequency-angle switching unit 140 which propagates light in a space by varying the angle with the center optical frequency of the light; an optical detection unit 150 which converts an intensity signal of the light from the optical circulation unit 190 into an electric intensity signal over time; and a signal processing unit 170 which analyzes a measured electric intensity signal into spatial information of the target, wherein the distance to the object located based on the propagation angle corresponding to the center optical frequency of the propagated light is measured by extracting distance information of the target from the electric intensity signal converted by the optical detection unit 150.

Referring to FIG. 15, the distance measurement device will be described with respect to ToF and AMCW optical signals. The distance measurement device includes: an optical distribution unit which divides transmitted light at a specific ratio; and a signal processing unit which analyzes a measured electric intensity signal into spatial information of the target, wherein the distance to the object located based on the propagation angle corresponding to the center optical frequency of the propagated light is measured by extracting distance information of the target from the electric intensity signal converted by the optical detection unit.

Figure 20:
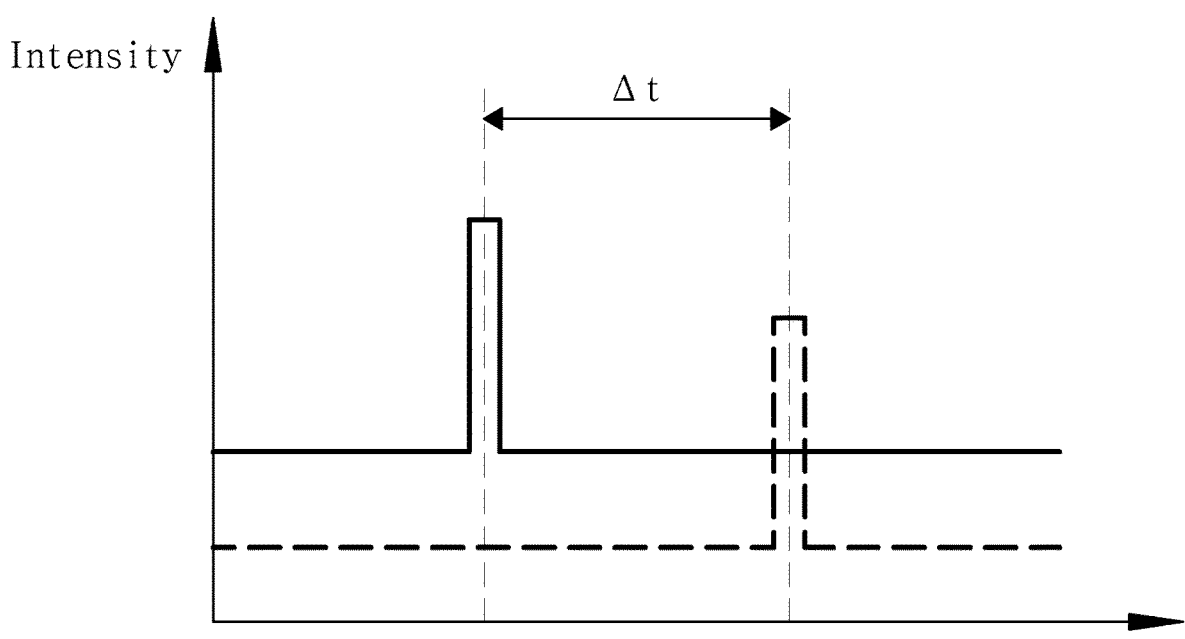
FIG. 20 is a diagram showing a ToF principle.

FIG. 20 is a diagram showing a ToF principle.

The center frequency of the laser changes periodically to produce light, and at the same time its intensity also is modulated into a pulse form to produce light. Signals reflected back from a reference reflection arm and an object have a time difference Δt, by which the distance to the object is measured.

That is, information is measured by measuring by measuring a time difference generated due to an optical path difference between light reflected back from a measurement target and light returned from the reference reflection arm.

In the distance measurement device with a ToF structure, the optical frequency scanning laser unit may be a mode-locked optical frequency scanning laser or a optical frequency scanning laser including an intensity modulator but are not limited thereto.

Figure 21:
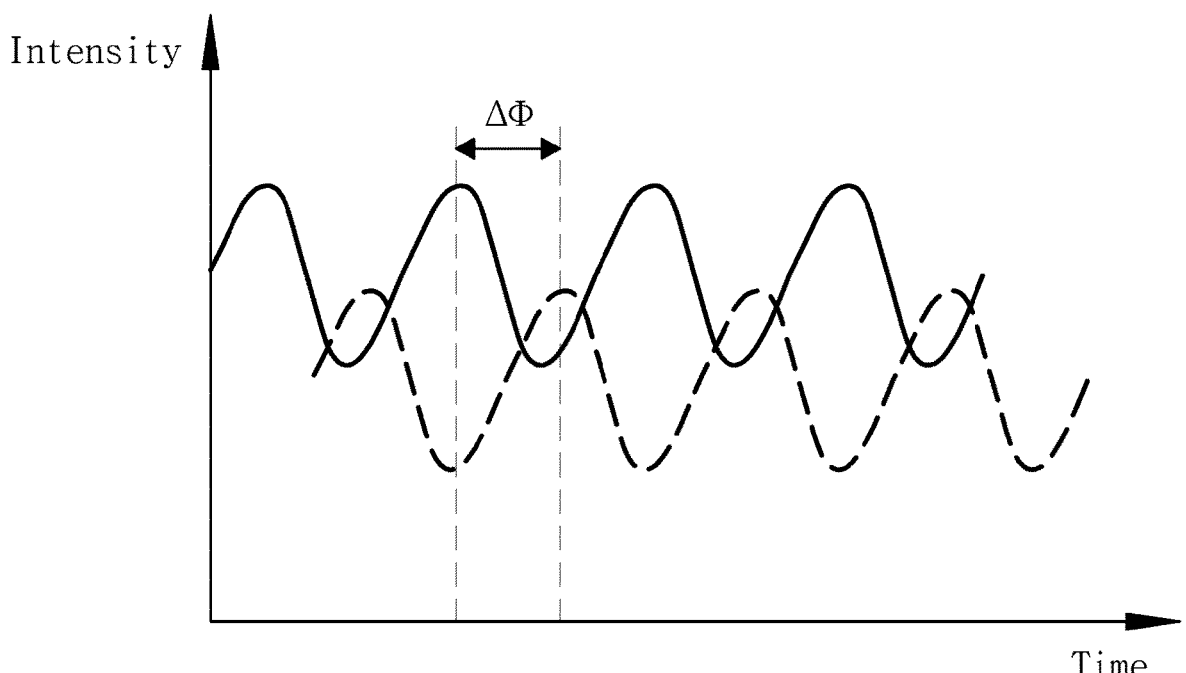
FIG. 21 is a diagram showing an AMCW principle.

FIG. 21 is a diagram showing an AMCW principle.

A time difference is generated due to an optical path difference between light reflected back from a measurement target and light returned from the reference reflection unit, and information is measured by measuring a phase difference in an intensity-modulated signal caused by the time difference.

In the distance measurement device with an AMCW structure, the optical frequency scanning laser unit may be a mode-locked optical frequency-scanning laser or a optical frequency-scanning laser including an intensity modulator but are not limited thereto.

Figure 22:
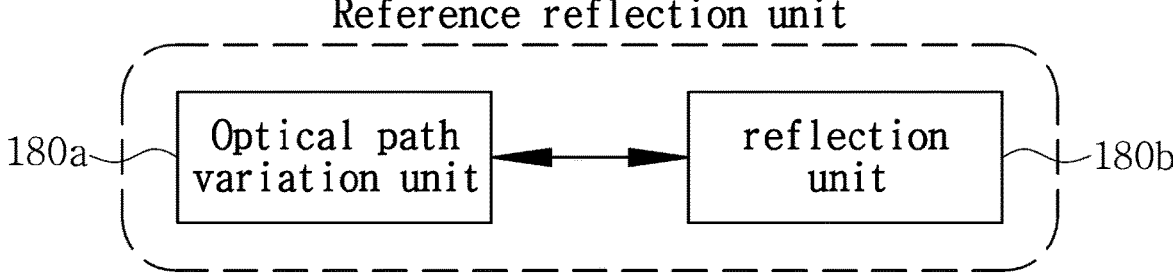
FIG. 22 is a detailed block diagram of a reference reflection unit.

FIG. 22 is a detailed block diagram of a reference reflection unit.

The reference reflection unit includes: an optical path variation unit 180a which compensates for a reference optical path difference by adjusting the length of the optical path; and a reflection unit 180b which reflects back light transmitted from the optical path variation unit 180a.

The optical path variation unit 180a is an optical path difference component which compensates for a reference optical path difference by generating a previously known time delay.

Figures 23A, 23B:
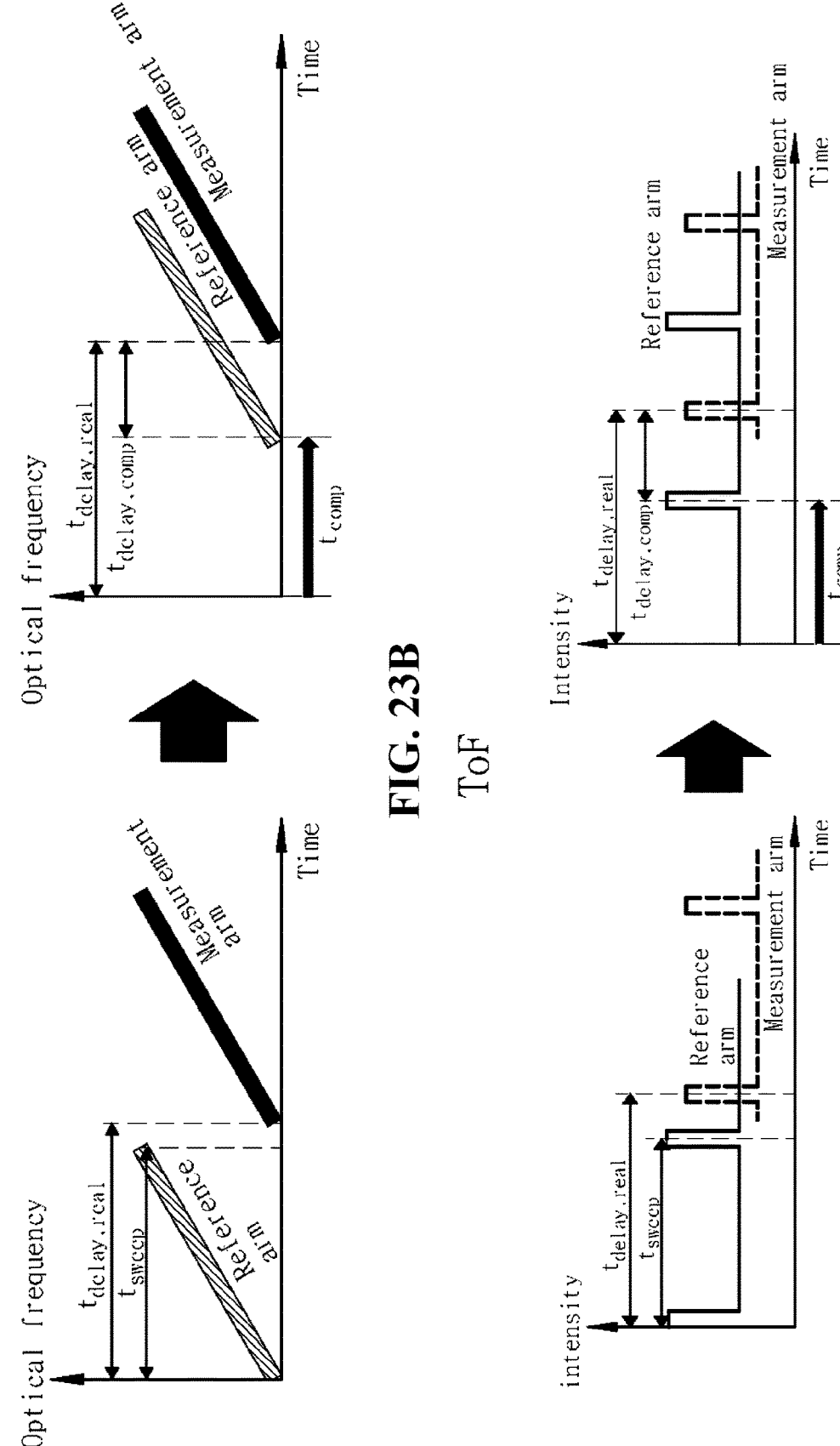
Figure 23C:
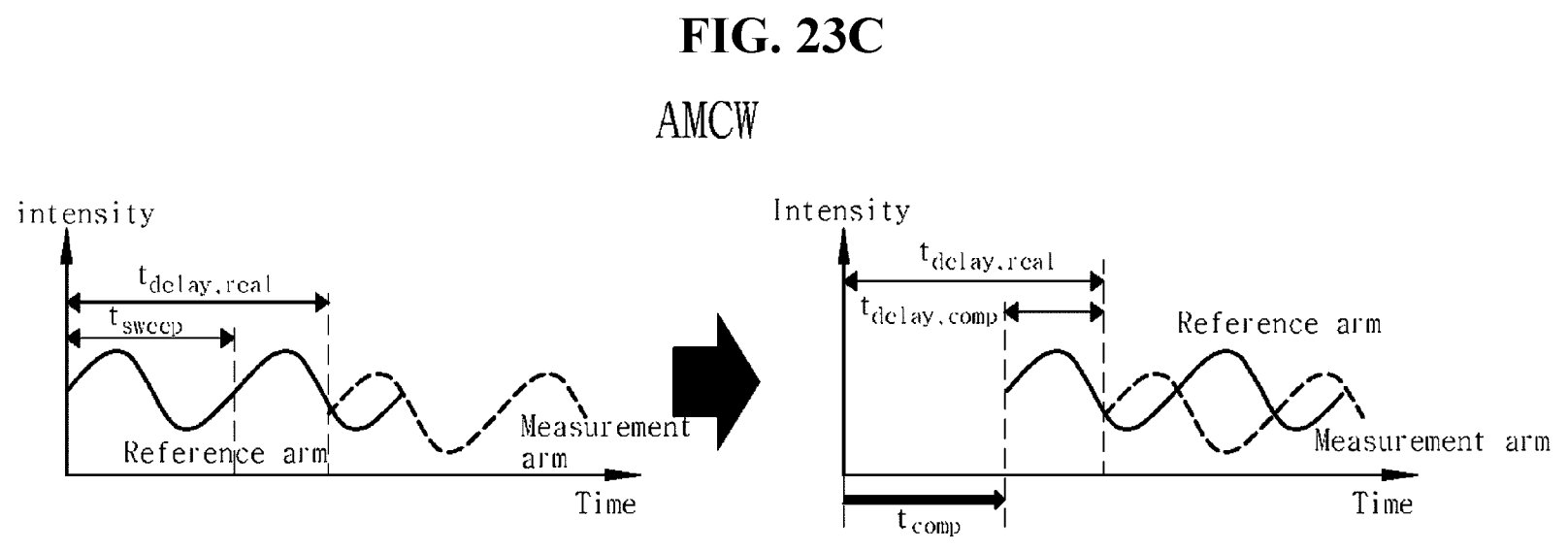

FIGS. 23A to 23C are diagrams showing measurement characteristics of distance measurement devices when there is a time delay caused by an optical path difference.

FIG. 23A shows characteristics of a distance measurement device with an FMCW structure when a time delay caused by an optical path difference is longer than an interval period, FIG. 23B shows characteristics of a distance measurement device with a ToF structure when a time delay caused by an optical path difference is longer than an interval period, and FIG. 23C shows characteristics of a distance measurement device with an AMCW structure when a time delay caused by an optical path difference is longer than an interval period.

If an actual delay time $t_{delay.real}$ caused by an optical path difference is longer than a repetition period $t_{sweep}$ of the laser, distance measurement is not possible even if the distance to a target is shorter than the coherence distance of the laser and the intensity of a reflection signal is higher than the intensity of a noise signal.

The optical path variation unit provides a compensation time $t_{comp}$ by adding an optical path difference so as to make best use of coherence distance, and allows for measurement by making a compensation time delay $t_{delay.comp}$ shorter than the actual delay time due to the compensation time.

That is, in order to solve the problem, which is that a time delay generated by an optical path difference is longer than an interval period of the center frequency of periodically repeated and produced laser light, or an interval period between produced pulses, or an interval period between produced signals whose intensity is modulated, and that therefore measurement is impossible even if the distance to the object is shorter than the coherence distance of the laser and the intensity of a reflection signal is higher than the intensity of a noise signal, a time delay is deliberately generated by means of the optical path variation unit, thereby shortening the time delay generated by the optical path difference than the interval period of produced laser light.

As explained above, the dual-spectral variable-based oscillation optical frequency scanning laser light source and the measurement device using the same according to the present disclosure make it possible to actively change output characteristics by scanning the optical frequency of laser light oscillating in an optical resonance unit over time as both selective variation of a transmission optical frequency band and selective variation of a resonant optical frequency occur.

As explained above, the object angle-dependent distance measurement device using propagation angle switching for each center optical frequency, that uses a dual-spectral variable-based oscillation optical frequency scanning laser light source, according to the present disclosure makes it possible to obtain distance information for each propagation angle of a measurement target at various positions in a space by using a optical frequency scanning laser (light source) whose center optical frequency changes over time.

The present disclosure relates a laser light source and a measurement and, more particularly, to a dual-spectral variable-based oscillation optical frequency scanning laser light source which enables sequential scanning of oscillation laser outputs, throughout the entire band wider than a channel band, and a measurement device using the same.

The present disclosure relates to an object angle-dependent distance measurement device using propagation angle switching for each center optical frequency of a optical frequency scanning laser (light source), and more particularly, to an object angle-dependent distance measurement device using propagation angle switching for each center optical frequency, that uses a dual-spectral variable-based oscillation optical frequency scanning laser light source, which makes it possible to obtain distance information for each propagation angle of a measurement target at various positions in a space by using a optical frequency scanning laser (light source) whose center optical frequency changes over time.

The invention claimed is:

1. A measurement device using a dual-spectral variable-based oscillation optical frequency scanning laser light source, the measurement device comprising:

an oscillation optical frequency scanning laser light source unit which sequentially scans the optical frequency of oscillated laser light as both selective variation of an optical band by a transmission optical band variation unit and selective variation of an optical frequency by a resonant optical frequency variation unit occur;

a beam splitter in which part of light transmitted from the oscillation optical frequency scanning laser light source unit causes different channel variations through selective variation of a specific transmission optical band;

a receiver in which a diagnostic target is positioned so that light is transmitted from the beam splitter and reflected from the diagnostic target;

a mixer which induces an optical interference signal as the light transmitted and reflected back from the receiver interferes with a remaining part of the light transmitted from the oscillation optical frequency scanning laser light source unit; and an optical measurement unit which obtains information on the diagnostic target from the optical interference signal transmitted from the mixer through selective oscillation and variation of the optical frequency.

2. A measurement device using a dual-spectral variable-based oscillation optical frequency scanning laser light source, the measurement device comprising:

an oscillation optical frequency scanning laser light source unit which sequentially scans the optical frequency of oscillated laser light as both selective variation of an optical band by a transmission optical band variation unit and selective variation of an optical frequency by a resonant optical frequency variation unit occur;

a beam splitter which induces multichannel information transmission and acquisition as light of different optical frequencies caused by selective variation of the optical band by the resonant optical frequency variation unit is divided by optical frequency channel division and travels to optical fibers;

a receiver in which a diagnostic target is positioned so that light is transmitted to optical fibers and reflected on the optical fibers from the diagnostic target;

a mixer which induces an optical interference signal; and an optical measurement unit which scans and measures optical fiber information of the diagnostic target over time from the optical interference signal through selective oscillation and variation of the optical frequency by the resonant optical frequency variation unit, the optical fiber information corresponding to channels for different optical frequencies.

3. A measurement device using a dual-spectral variable-based oscillation optical frequency scanning laser light source, the measurement device comprising:

an oscillation optical frequency scanning laser light source unit which sequentially scans the optical frequency of oscillated laser light as both selective variation of an optical band by a transmission optical band variation unit and selective variation of an optical frequency by a resonant optical frequency variation unit occur;

a beam splitter in which light transmitted from the oscillation optical frequency scanning laser light source unit causes different channel variations through selective variation of a specific transmission optical band;

a receiver in which a diagnostic target is positioned so that light is transmitted from the beam splitter and reflected from the diagnostic target;

an optical detection unit which converts a variation in an intensity of the light transmitted and reflected back from the receiver into an electric signal over time; and an optical measurement unit which obtains light spectrum information for each optical frequency of the diagnostic target from the variation over time of the electric signal transmitted from the optical detection unit.

4. An object angle-dependent distance measurement device using propagation angle switching for each center optical frequency, that uses a dual-spectral variable-based oscillation optical frequency scanning laser light source, the object angle-dependent distance measurement device comprising:

an optical frequency scanning laser unit which produces light whose center frequency changes continuously over time;

a mixer diffractive waveguide which propagates light transmitted from the optical frequency scanning laser unit in a space by varying an optical frequency angle with the center optical frequency of the light; and an optical detection unit which converts an intensity signal of the propagated light transmitted and reflected back from a target into an electric intensity signal over time, wherein a distance to an object located based on the propagation angle corresponding to the center optical frequency of the propagated light is measured by extracting distance information of the target from the electric intensity signal converted by the optical detection unit.

5. The object angle-dependent distance measurement device of claim 4, wherein distances are discerned by dividing into smaller units of transverse width depending on a change in a transverse position of a target, if an amount of change in the transverse position of a remote target corresponding to an angle variation caused by a change in the center optical frequency of light produced by an optical frequency scanning by the optical frequency scanning laser unit is larger than the transverse width of a target corresponding to a long-distance propagation dispersion caused by a line width of an instantaneous output optical frequency by the optical frequency scanning laser unit.

6. The object angle-dependent distance measurement device of claim 4, further comprising:

a beam splitter which divides the light transmitted from the light source at a specific ratio;

a first optical circulation unit which transmits a distributed beam of light to a specific port and transmits returned light to a third port;

a second optical unit which transmits another distributed beam of light to a specific port and transmits returned light to a third port;

a reference reflection unit which forms an optical signal as a reference;

an optical coupling unit which couples together the beams of light transmitted from the two first and second optical circulation units; and a signal processing unit which analyzes an electric intensity signal measured by the optical detection unit, which converts an intensity signal of the light from the optical coupling unit into an electric intensity signal over time, into spatial information of the target, wherein the distance to the object located based on the propagation angle corresponding to the center optical frequency of the propagated light is measured by extracting distance information of the target from the electric intensity signal converted by the optical detection unit.

7. The object angle-dependent distance measurement device of claim 6, wherein a time difference is generated due to an optical path difference between light reflected back from the measurement target and light returned from the reference reflection unit, light beams of different optical frequencies are transmitted simultaneously to the optical detection unit due to the generated time difference, and information is measured through an interference between the transmitted light beams of different optical frequencies.

8. The object angle-dependent distance measurement device of claim 6, wherein information is measured by measuring a time difference generated due to an optical path difference between light reflected back from the measurement target and light returned from the reference reflection unit.

9. The object angle-dependent distance measurement device of claim 6, wherein a time difference is generated due to an optical path difference between light reflected back from the measurement target and light returned from the reference reflection unit, and information is measured by measuring a phase difference in an intensity-modulated signal caused by the time difference.

10. The object angle-dependent distance measurement device of claim 4, further comprising a reference reflection unit which forms an optical signal as a reference, wherein the reference reflection unit comprises:

a scanner which compensates for a reference optical path difference by adjusting a length of an optical path; and a reflection unit which reflects back light transmitted from the scanner.

11. The object angle-dependent distance measurement device of claim 10, wherein, in order to solve a problem, which is that a time delay generated by an optical path difference is longer than an interval period of the center frequency of periodically repeated and produced laser light, or an interval period between produced pulses, or an interval period between produced signals whose intensity is modulated, and that therefore measurement is impossible even if the distance to the object is shorter than a coherence distance of the laser light and the intensity of a reflection signal is higher than the intensity of a noise signal, a time delay is deliberately generated by means of the scanner, thereby shortening the time delay generated by the optical path difference than the interval period of produced laser light.

* * * * *